(12) United States Patent
Sun et al.

(10) Patent No.: US 12,411,615 B2
(45) Date of Patent: Sep. 9, 2025

(54) ERROR CORRECTION METHODS FOR COMPUTATIONAL SSD SUPPORTING RAPID FILE SEMANTIC SEARCH

(71) Applicant: Western Digital Technologies, Inc., San Jose, CA (US)

(72) Inventors: Chao Sun, San Jose, CA (US); Muqing Liu, San Jose, CA (US); Yan Li, Milpitas, CA (US); Dejan Vucinic, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 88 days.

(21) Appl. No.: 18/449,165

(22) Filed: Aug. 14, 2023

(65) Prior Publication Data

US 2024/0211146 A1 Jun. 27, 2024

Related U.S. Application Data

(60) Provisional application No. 63/476,666, filed on Dec. 22, 2022.

(51) Int. Cl.
*G06F 3/06* (2006.01)
*G06F 11/10* (2006.01)

(52) U.S. Cl.
CPC .......... *G06F 3/0619* (2013.01); *G06F 3/065* (2013.01); *G06F 3/0679* (2013.01); *G06F 11/1044* (2013.01)

(58) Field of Classification Search
CPC .......... G06N 20/00; G06N 3/08; G06F 3/065; G06F 3/0619; G06F 3/0679; G06F 11/1044

(Continued)

(56) References Cited

U.S. PATENT DOCUMENTS 11,010,431 B2   5/2021  Olarig et al.
11,158,369 B2  10/2021  Sharon et al.
(Continued)

FOREIGN PATENT DOCUMENTS

CN   112182320 A   1/2021
CN   115146070 A  10/2022
KR  20170060321 A   6/2017

OTHER PUBLICATIONS

Matam, K., et al. "GraphSSD: Graph Semantics Aware SSD," ISCA '19, Jun. 2019, Phoenix, AZ.
(Continued)

*Primary Examiner* — Jared I Rutz
*Assistant Examiner* — Edward Waddy, Jr.
(74) *Attorney, Agent, or Firm* — Rutan & Tucker LLP; Ravi Mohan; Hani Z. Sayed

(57) ABSTRACT

Devices and methods to implement semantic searching on SSD through a computational SSD system that distributes computing to each NAND flash die of the SSD while the SSD controller handles the results aggregation with new on-die computation logic circuits to provide on device file semantic search are disclosed herein. The computational SSD system can read file feature vectors from multiple dies to the SSD controller, and if needed, these feature vectors may be buffered in DRAM and controller handles distance computing. Local, on-die AI/ML processing units may perform, for example, computation and comparison operations and pass the processing scores and results to the SSD controller. The SSD controller aggregates results from all dies and returns the result to the host. The feature vector store size, circuitry and number of on-die AI/ML processing units may be configured as needed to adapt to different tasks, system constraints, and/or feature vector sizes.

12 Claims, 16 Drawing Sheets

(58) Field of Classification Search
USPC .......................................................... 711/154
See application file for complete search history.

(56) References Cited

U.S. PATENT DOCUMENTS

| | | | |
|---|---|---|---|
| 2020/0034666 A1* | 1/2020 | Yun | G06F 18/214 |
| 2020/0401344 A1 | 12/2020 | Bazarsky et al. | |
| 2021/0019226 A1* | 1/2021 | Hassan | G06F 3/0659 |
| 2021/0334300 A1* | 10/2021 | Banda | G06N 3/08 |
| 2022/0076073 A1 | 3/2022 | Hulton et al. | |
| 2022/0229724 A1* | 7/2022 | Bains | G06F 11/1072 |
| 2022/0318898 A1* | 10/2022 | Pei | G06F 17/16 |

OTHER PUBLICATIONS

Park, S., et al. "SMFS: Semantic Multimedia Filesystem for Mobile Multimedia Devices," The 1st IEEE Global Conference on Consumer Electronics, 2012.

Do, J. et al., "Cost-effective, Energy-efficient, and Scalable Storage Computing for Large-scale AI Applications," ACM Transactions on Storage, vol. 16, No. 4 Article 21. Oct. 2020.

* cited by examiner

| DATA | FILE DATA | FEATURE VECTOR |
|---|---|---|
| ECC | CONTROLLER ECC | ON-DIE ECC |
| SCRUBBING SCHEME | CONVENTIONAL SCRUBBING | FV SCRUBBING |

| DATA | FILE DATA | HDV | HDV-COPY |
|---|---|---|---|
| ECC | CONTROLLER ECC | NO ECC | CONTROLLER ECC |
| SCRUBBING SCHEME | CONVENTIONAL SCRUBBING | NO SCRUBBING | CONVENTIONAL SCRUBBING/HDV SCRUBBING | ns
ERROR CORRECTION METHODS FOR COMPUTATIONAL SSD SUPPORTING RAPID FILE SEMANTIC SEARCH

PRIORITY

This application claims the benefit of and priority to U.S. Provisional Application No. 63/476,666, filed Dec. 22, 2022, which is incorporated in its entirety herein.

FIELD

The present disclosure relates to storage systems. More particularly, the present disclosure relates to utilizing storage systems to perform machine learning processes.

BACKGROUND

Storage devices are ubiquitous within computing systems. Recently, solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

As they have evolved, SSDs have become more power efficient compared to traditional hard disk drives (HDDs), hence giving SSDs an advantage in consumer and commercial markets. Over the years, many users have accumulated thousands of files documenting their lives, experiences, travels, and interests. To find particular media files based on their content, users often spend many hours navigating, organizing, and searching albums and folders for specific photos, videos, and other media. Generally, user media is stored across various storage and computing devices, and users have limited methods for contextually searching photos, videos, and other media to find the desired media file. Indeed, users are limited to conventional search methods such as lexical search for finding media on storage systems which are limited to searching for recent files or files with specific filenames or attributes. Moreover, the sheer volume of stored media files and lack of contextual search methods make it difficult for users to find specific media on their storage and computing devices.

With the development of Artificial Intelligence (AI) and Machine Learning (ML), accurate semantic searching has become possible allowing users to find relevant content within their media files stored on their storage devices. However, conventional implementations of AI/ML semantic searching of storage devices have some problems that make it inefficient and limited. One problem in conventional AI/ML implementations of semantic searching is that data is repeatedly moved between the host processor, the host memory, and the storage device leading to substantial waste of bandwidth and energy from data movement. Another problem in conventional AI/ML implementations of semantic searching is in preparing data for AI/ML processing for on host computing, that is, reading data from multiple dies to the storage device controller and buffering the data in memory for the controller to handle AI/ML processing, then performing AI/ML processing. This causes a bottleneck for the storage device controller, as the controller has to handle both I/O and computing operations, and such computation requires additional memory buffer to store data for AI/ML processing.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
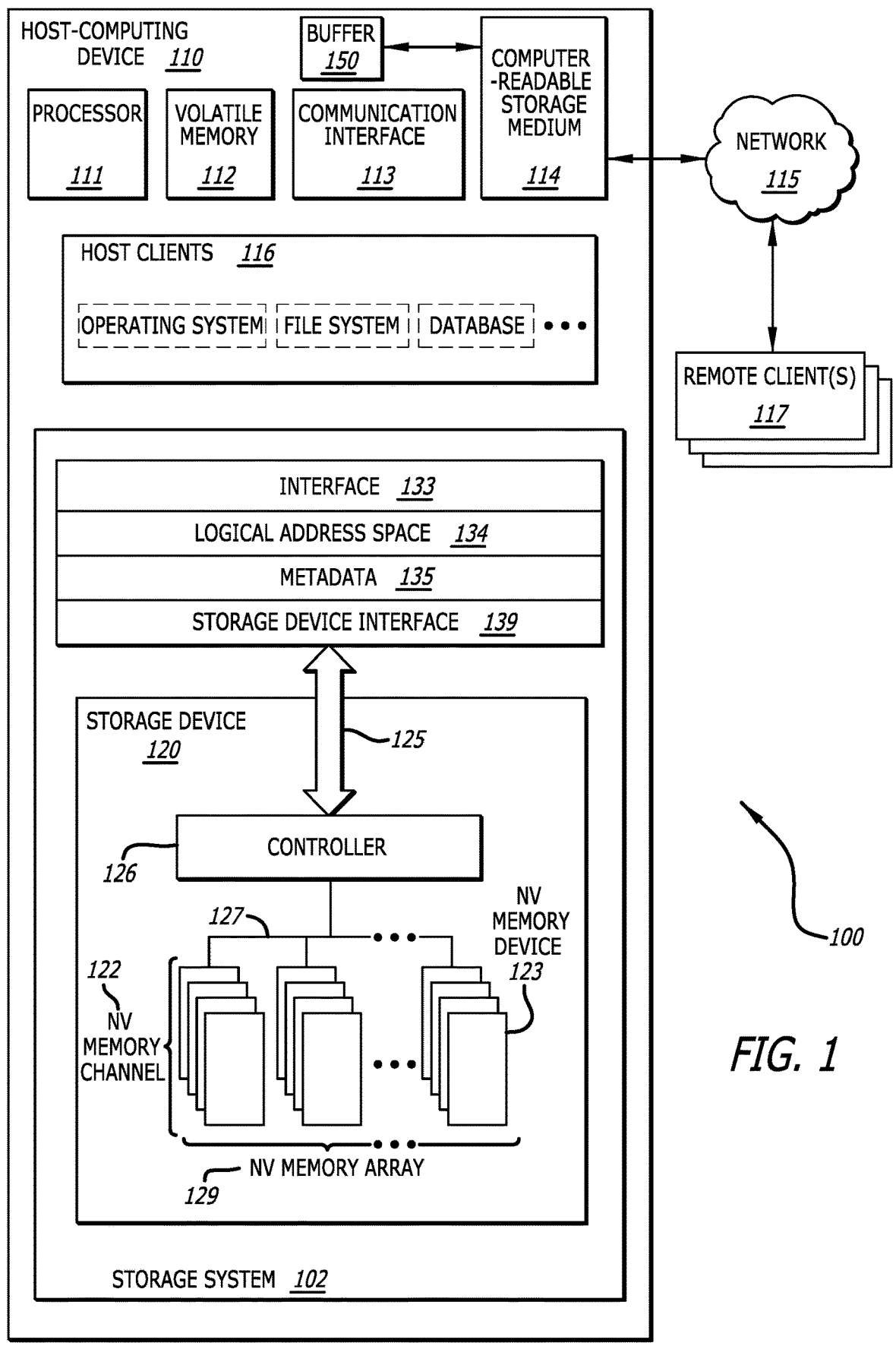
FIG. 1 is a schematic block diagram of an example host-computing device with a storage system suitable for computational SSD system supporting semantic search in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that can implement semantic searching on SSD through a computational SSD system that distributes computing to each NAND flash die of the SSD, while the SSD controller handles the results aggregation with new on-die computation logic circuits to provide on device file semantic search. Specifically, many embodiments utilize computational SSD system that reads file feature vectors from multiple dies to the SSD controller, if there are millions of feature vectors to be compared, these feature vectors may be buffered in DRAM and controller handles the distance computing. Local, on-die AI/ML processing units may perform, for example, computation and comparison operations and pass the processing scores and results to the SSD controller. The SSD controller aggregates results from all dies and returns the result to the host. In some embodiments, the feature vector store size each on-die AI/ML processing unit may be configured as needed to adapt to different tasks and/or feature vector sizes. Based on this, the circuitry of AI/ML processing units and number of on-die AI/ML processing units may be configured and distributed as needed to provide increased computational speed or to meet certain die area constraints. Additional embodiments are discussed in more detail below.

These solutions can help reduce substantial waste of bandwidth and energy from data movement between the host processor, the host memory, and the storage device. Moreover, these solutions can help reduce a bottleneck for the storage device controller in AI/ML processing where the storage device controller needs to handle both I/O and computing operations in AI/ML operations which requires reading the feature vectors from the multiple dies to the controller and buffering the feature vectors in memory to perform AI/ML computations and processing.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that may not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items may not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of an example host-computing device 110 with a storage system 102 suitable for computational SSD system supporting semantic search in accordance with an embodiment of the disclosure is shown. The computational SSD system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such as, but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 may be part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 may be referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but may not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 may be configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines may be logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
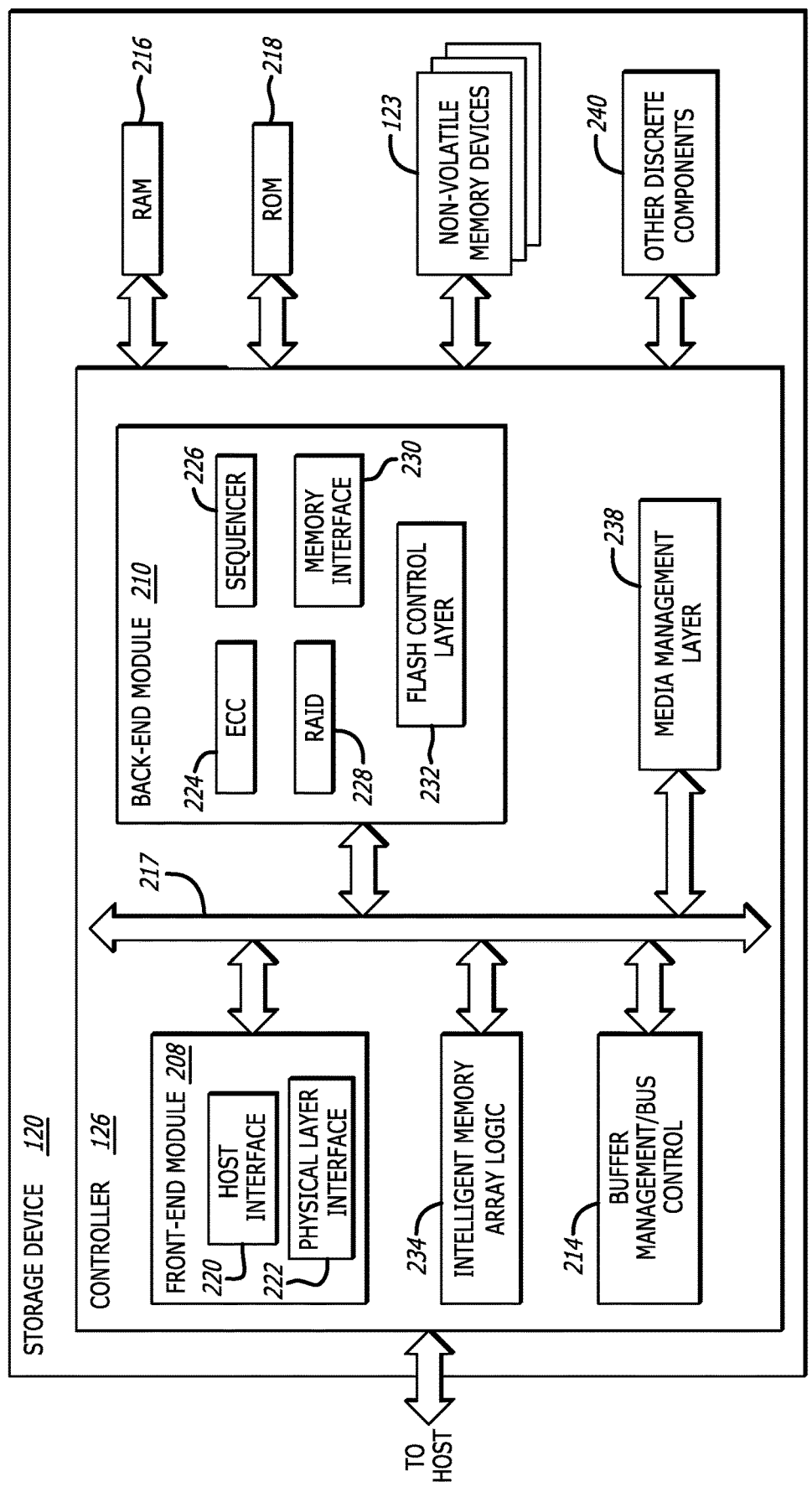
FIG. 2 is a schematic block diagram of an example storage device suitable for computational SSD system supporting semantic search in accordance with an embodiment of the disclosure.

Referring to FIG. 2, a schematic block diagram of an example storage device 120 suitable for computational SSD system supporting semantic search in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Example types of the host interfaces 220 may include, but may not limited to, SATA, SATA Express, SAS, Fibre Channel, USB, PCIe, and NVMe. The host interface 220 may typically facilitate transfer for data, control signals, and timing signals.

The back-end module 210 may include an error correction engine 224 that encodes the data bytes received from the host and decodes and error corrects the data bytes read from the non-volatile memory devices 123 using error-correction code (ECC). The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the error correction engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 may be optional components that may not be necessary in the controller 126.

Finally, the controller 126 may also comprise an intelligent memory array logic 234. In many embodiments, the intelligent memory array logic 234 can be configured to receive a query, extract contextual data from the received query, and determine a machine learning model for processing the query based on the extracted contextual data. The determination of a machine learning models for further processing the query can be done by controller 126. In some embodiments, the controller 126 may determine one or more suitable machine learning models for further processing the query. The intelligent memory array logic 234 may be provided by hardware, firmware, software, electrical circuitry and/or components, or any combinations thereof for receiving data (e.g., a query) and performing machine learning processes, computations, comparisons, operations, or other processing to obtain and/or extract contextual data from the received query to generate one or more query vectors and then determine one or more suitable machine learning models for further processing the one or more query vectors. This can include accessing control data stored within the storage device 120, scanning the non-volatile memory devices 123 for relevant pages and determining the relevant non-volatile memory devices 123 associated with the generated query vector, and passing the query vector to the one or more determined relevant non-volatile memory devices 123.

Each of the non-volatile memory devices 123 may include feature data and feature vector store relevant to one or more machine learning models and processes. The feature data may be distributed evenly within each of one or more non-volatile memory devices 123. In some embodiments, non-volatile memory devices 123 may be grouped into a plurality of sets, where each set of non-volatile memory devices 123 provides a specific machine learning model and performs machine learning processes based on the specific machine learning model. Moreover, each set of non-volatile memory devices 123 may comprise the same or different feature data and feature vector store. The controller 126 may then pass the query vector to one or more relevant non-volatile memory devices 123.

Each of the non-volatile memory devices 123 of memory array 129 may further include one or more machine learning processing units configured to process the query vector obtained from controller 126 as a first input. The feature data within one or more non-volatile memory device 123 may be utilized as a second input, and the query vector and feature data may be buffered in a memory device prior to processing by the one or more machine learning processing units. For example, processing the first and second inputs to generate a comparison value. The one or more non-volatile memory device 123 may be grouped into one or more memory sets based on similarity in machine learning processing units or similarity in feature data. The controller 126 may obtain either the comparison value or output data as a result of processing the first and second inputs from the one or more non-volatile memory device 123. In some embodiments, one or more sets of non-volatile memory devices 123 may be grouped together based on particular machine learning model or processing, similarity in machine learning processing units, or similarity in feature data.

Figure 3:
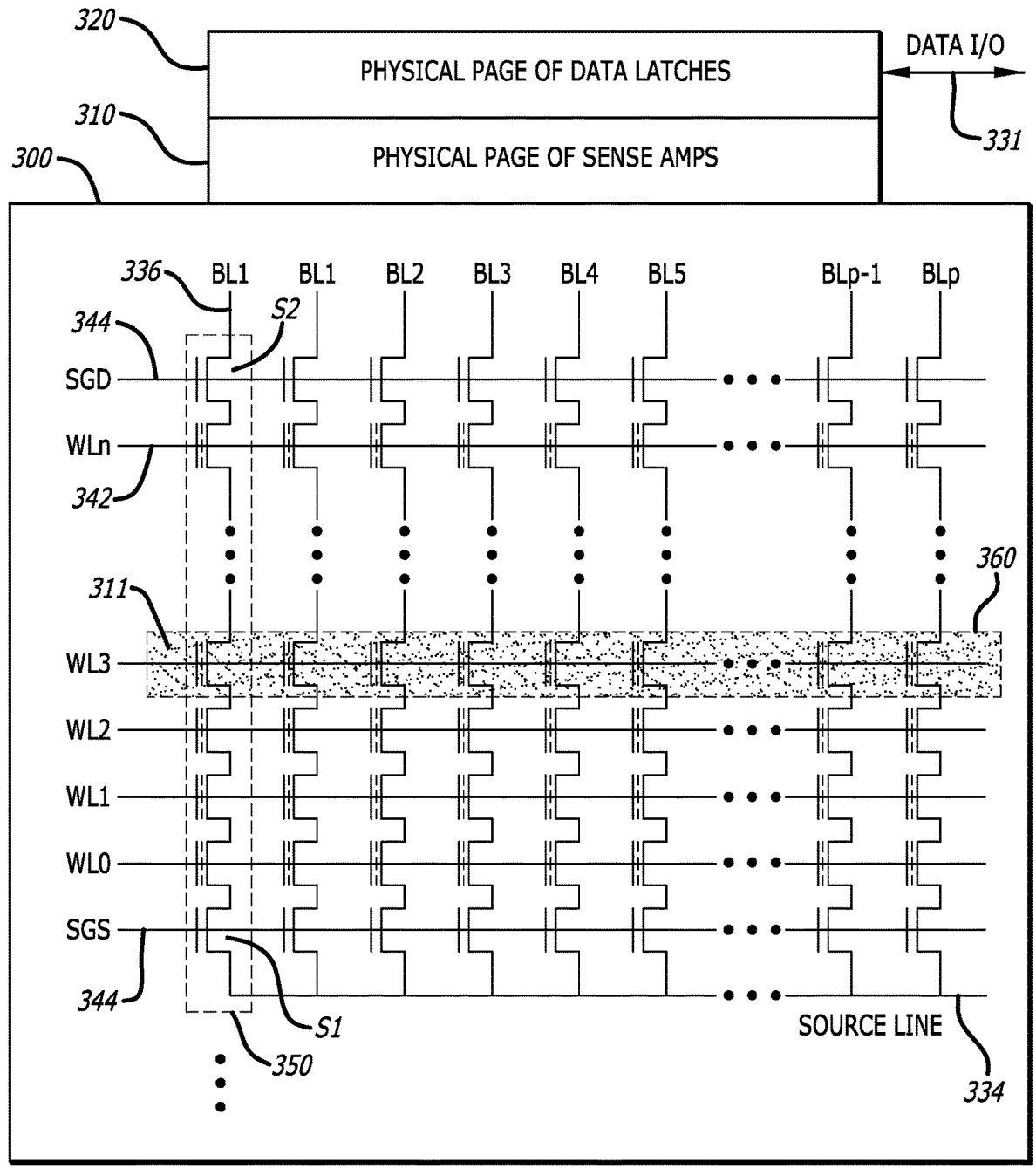
FIG. 3 is a conceptual illustration of a page of memory cells, organized for example in the NAND configuration, being sensed or programmed in parallel in accordance with an embodiment of the disclosure.

Referring to FIG. 3, a conceptual illustration of a page of memory cells, organized for example in the NAND configuration, being sensed or programmed in parallel in accordance with an embodiment of the disclosure. FIG. 3 conceptually shows a bank of NAND strings 350 within a non-volatile memory device 123 of FIG. 1. A 'page' such as the page 360, is a group of memory cells enabled to be sensed or programmed in parallel. This is accomplished in the peripheral circuits by a corresponding page of sense amplifiers 310. The sensed results may be utilized in latches within a corresponding set of data latches 320. Each sense amplifier can be coupled to a NAND string, such as NAND string 350 via a bit line 336. For example, the page 360 may be along a row and is sensed by a sensing voltage applied to the control gates of the cells of the page connected in common to the word line WL3. Along each column, each memory cell such as memory cell 311 may be accessible by a sense amplifier via a bit line 336. Data in the data latches 320 may be toggled in from or out to the memory controller 126 via a data I/O bus 331.

The NAND string 350 can be a series of memory cells, such as memory cell 311, daisy-chained by their sources and drains to form a source terminal and a drain terminal respective at its two ends. A pair of select transistors S1, S2 can control the memory cell chain's connection to the external source via the NAND string's source terminal and drain terminal, respectively. In a memory array, when the source select transistor S1 is turned on, the source terminal is coupled to a source line 334. Similarly, when the drain select transistor S2 is turned on, the drain terminal of the NAND string is coupled to a bit line 336 of the memory array. Each memory cell 311 in the chain acts to store a charge. It has a charge storage element to store a given amount of charge so as to represent an intended memory state. In many embodiments, a control gate within each memory cell can allow for control over read and write operations. Often, the control gates of corresponding memory cells of each row within a plurality of NAND strings may be all connected to the same word line (such as WL0. WL1 . . . WLn 342). Similarly, a control gate of each of the select transistors S1, S2 (accessed via select lines 344 SGS and SGD respectively) provides control access to the NAND string via its source terminal and drain terminal, respectively.

While the example memory device referred to above comprises physical page memory cells that store single bits of data, in most embodiments each cell is storing multi-bit data, and each physical page can have multiple data pages. Additionally, in further embodiments, physical pages may store one or more logical sectors of data. Typically, the host-computing device 110 (see FIG. 1) operating with a disk operating system manages the storage of a file by organizing the content of the file in units of logical sectors, which is typically in one or more units of 512 bytes. In some embodiments, a physical page may have 16 kB of memory cells being sensed in parallel by corresponding 16 kB of sense amplifiers via 16 kB of bit lines. An example logical sector assigned by the host has a size of 2 kB of data. Thus, a physical page can store 8 sectors if the cells are each configured to store 1 bit of data (SLC). For MLC, TLC, and QLC and other increased density structures, each cell can store 2, 3, 4 or more bits of data, and each physical page can store 16, 32, 64 or more logical sectors depending on the structure utilized. For feature vector size and allocation in the computational SSD system supporting semantic search, the machine learning processing unit of the non-volatile memory device 123 may be configured to be able to adapt to different feature vector size. As an example, a media file (e.g., image, document, video, etc.,) may be represented by any number of feature vectors. In some embodiments, a feature vector for a media file could be 128-1024 features, the size of a feature vector may be 256B-2 KB. Then for a 16 KB NAND flash page, reading a page will get 8-64 feature vectors.

One unique difference between flash memory and other types of memory is that a memory cell must be programmed from an erased state which is associated with no charge within the memory cell. This requires that the floating gate must first be emptied of charge prior to programming. Programming adds a desired amount of charge back to the floating gate. It may not support removing a portion of the charge from the floating to go from a more programmed state to a lesser one. Thus, new data cannot overwrite existing data and must be written to a previously unwritten or erased location. Furthermore, erasing all the charges from a floating gate can often take an appreciable amount of time. For that reason, it will be cumbersome and inefficient to erase cell by cell or even page by page. Therefore, in most embodiments, the array of memory cells is often divided into a large number of blocks. As is common in many flash-based memory systems, the block is the unit of erase. That is, each block contains the minimum number of memory cells that may be erased in one action. This combined with the limited lifespans of memory cells within the flash memory increases the desire to limit the amount of erasing and programming occurring within the storage device.

Figure 4:
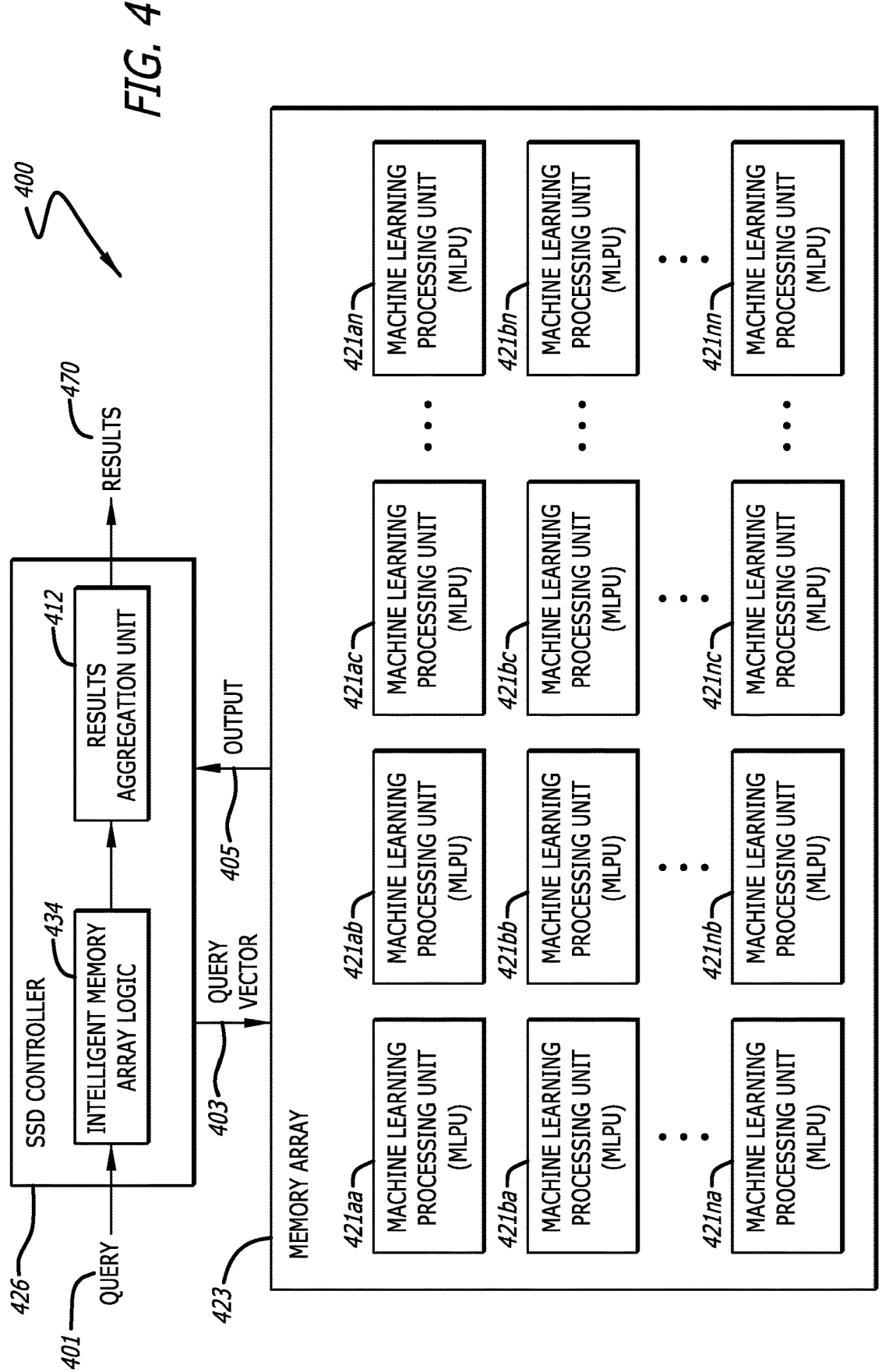
FIG. 4 is a schematic block diagram of an example computational SSD system supporting semantic search in accordance with an embodiment of the disclosure.

Referring to FIG. 4, a schematic block diagram of an example computational SSD system supporting semantic search in accordance with an embodiment of the disclosure. As discussed above, controller 426 includes intelligent memory array logic 434 and results aggregation unit 412. The controller 426 receives a semantic search query 401 and passes the query 401 to intelligent memory array logic 434 for processing. In some embodiments, the controller 426 may receive data (e.g., a query) and perform machine learning processes, computations, comparisons, operations, or other processing to obtain and/or extract contextual data from the received query 401, and prepare the query 401 for intelligent memory array logic 434. The contents of query 401 may include one or a plurality of text, documents, images, audio, or other media. Upon receiving query 401, controller 426 processes the query 401 and extracts contextual data from the query 401. In addition to extracting contextual data from query 401, other relevant contextual information for building contextual data may be obtained by comparison of the query 401 and/or contextual data with one or more dictionaries, libraries, or databases, or a combination thereof. The relevant contextual information may be added to query 401 or the extracted contextual data from query 401 for further processing. Moreover, the contextual information may be stored locally on controller 426 or remotely accessible to the controller 426 and intelligent memory array logic 434. The controller 426 passes the contextual data to intelligent memory array logic 434, and the intelligent memory array logic 434 makes a determination of the machine learning model for processing query 401 based on the contextual data provided by controller 426.

In some embodiments, the controller 426 may determine one or more suitable machine learning models or machine learning processes within intelligent memory array logic 434 for further processing the query 401. The intelligent memory array logic 434 may receive data (e.g., a query) and perform machine learning processes, computations, comparisons, operations, or other processing to obtain and/or extract contextual data from the received query 401.

The intelligent memory array logic 434 processes the query 401 and/or contextual data from query 401 and generates a query vector 403 based on the received query 401, the context data from the query 401, or a combination thereof. Further, the query vector 403 may be generated, in part, or in whole, based on the determined machine learning model. The intelligent memory array logic 434 may determine one or more relevant non-volatile memory devices 423 or sets of non-volatile memory devices 423 for processing the generated query vector 403. The determination may be based on the query 401, contextual data from query 401, relevant contextual information from the query 401, or the determined machine learning model, or any combination thereof. The intelligent memory array logic 434 then passes the generated query vector 403 to one or more relevant non-volatile memory devices 423.

As discussed above, each of the one or more non-volatile memory devices 423 comprise feature data and one or more machine learning processing units 421aa, 421ab, ... 421an, 421ba, 421bb, ... 421bn, 421na, 421nb, ... 421nn ... etc., (hereinafter, "machine learning processing unit 421") where each machine learning processing unit 421 may include hardware, firmware, software, electrical circuitry and/or components, or any combinations thereof for performing machine learning processes, computations, comparisons, operations, or other processing to obtain a result and/or value based on input(s) from feature data stored on non-volatile memory devices 423 and input(s) provided by the intelligent memory array logic 434. Each of the one or more machine learning processing units 421 may be configured to process the passed in query vector 403 as a first input and utilize stored feature data as a second input. The one or more machine learning processing units 421 may then process the first and second inputs to generate a result and/or value (e.g., a comparison value) as an output 405 to controller 426. The intelligent memory array logic 434 may add feature metadata to output 405 for further processing by the controller 426.

In some embodiments, the query vector 403 and feature data may be buffered in a memory device prior to processing by the one or more machine learning processing units 421. Moreover, the feature data may be distributed evenly within the one or more non-volatile memory devices 423. In some embodiments, each of the one or more non-volatile memory devices 423 may be grouped into one or more memory sets based on similarity in machine learning processing units or similarity in feature data.

The results aggregation unit 412 obtains results and/or value from all machine learning processing unit 421 as output 405 and performs machine learning processes, computations, comparisons, operations, or other processing on output 405, such as for example, searching, gathering, and presenting results from output 405 in a summarized, report-based, or tabular form as result 470. The result 470 may be passed to the host 110 for further processing.

Figure 5:
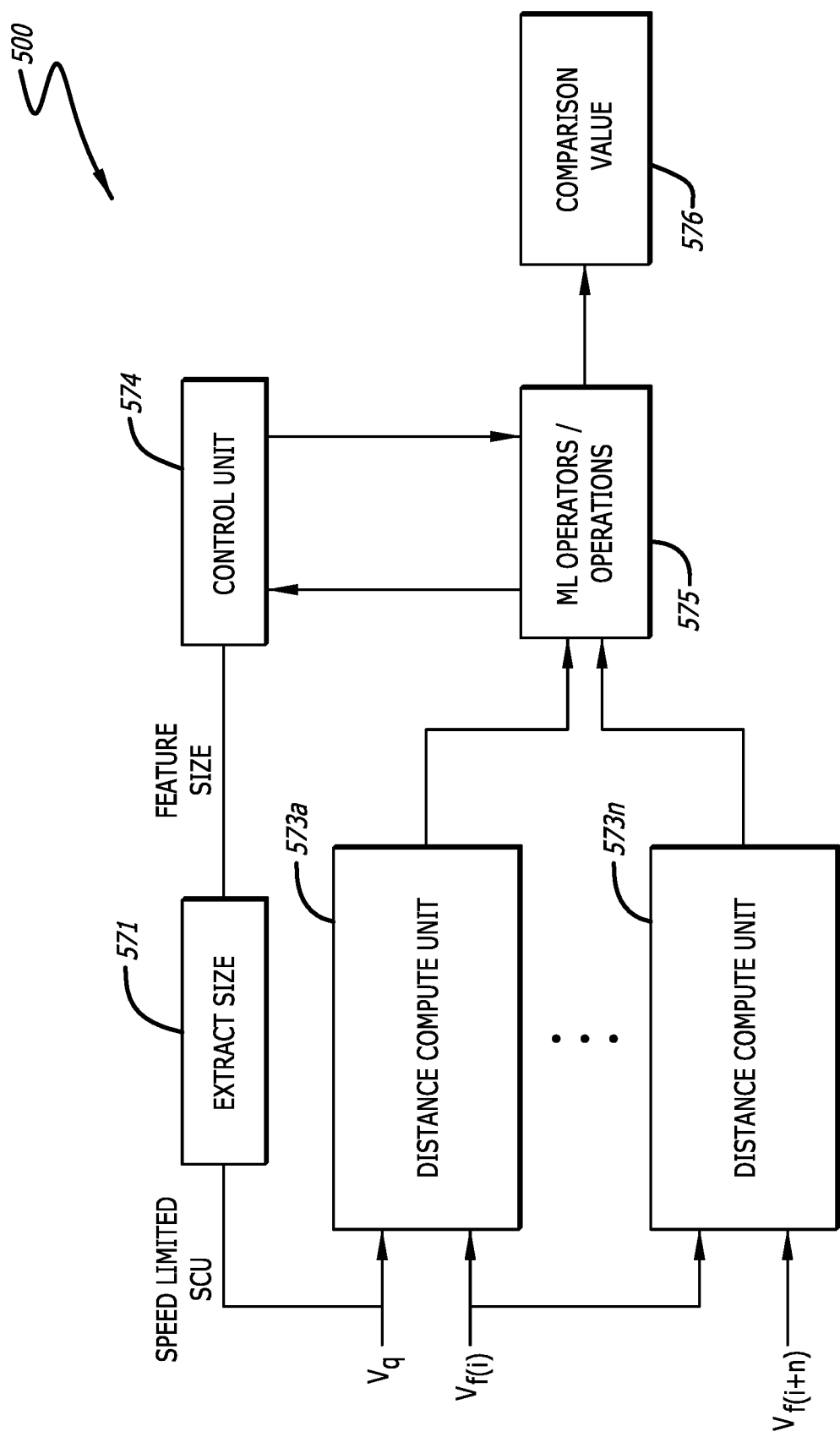
FIG. 5 is a schematic block diagram of an example machine learning processing unit of the computational SSD system supporting semantic search in accordance with an embodiment of the disclosure.

Referring to FIG. 5, a schematic block diagram of an example machine learning processing unit of the computational SSD system supporting semantic search in accordance with an embodiment of the disclosure. In some embodiments, the machine learning processing unit 421 may be configured to trade off area for speed, where speed is limited, yielding less hardware reuse or parallel processing with lower area efficiency. As an example, the machine learning processing unit 500 may be configured for higher speed. The machine learning processing unit 500 may include hardware, firmware, software, electrical circuitry and/or components, or any combinations thereof for performing machine learning processes, computations, comparisons, operations, or other processing. The machine learning processing unit 500 includes module 571 that determines the feature vector size of query vector $V_q$, one or more distance compute units 573a . . . 573n (hereinafter, "distance compute unit 573") that compute the distance (e.g., Euclidean/Hamming distance) between two input vectors (e.g., $V_q$, $V_{f(i)}$), control unit 574 that receives the feature size extracted from query vector V by module 571 and adapts to the variable feature vector size by, for example, comparing the number of distance comparisons to the feature vector size and choosing the correct one as the final similarity score of all the input feature vectors $V_{f(i)}$ . . . $V_{f(i+n)}$. Further, the machine learning processing unit 500 includes module 575 having one or more machine learning operators, functions, or registers to perform machine learning processing, for example, comparing two distance inputs from the distance compute units 573 and outputting the smaller distance to a register. The register of module 575 may then provide the result, score, or value to non-volatile memory devices 423 and/or controller 426.

Figure 6:
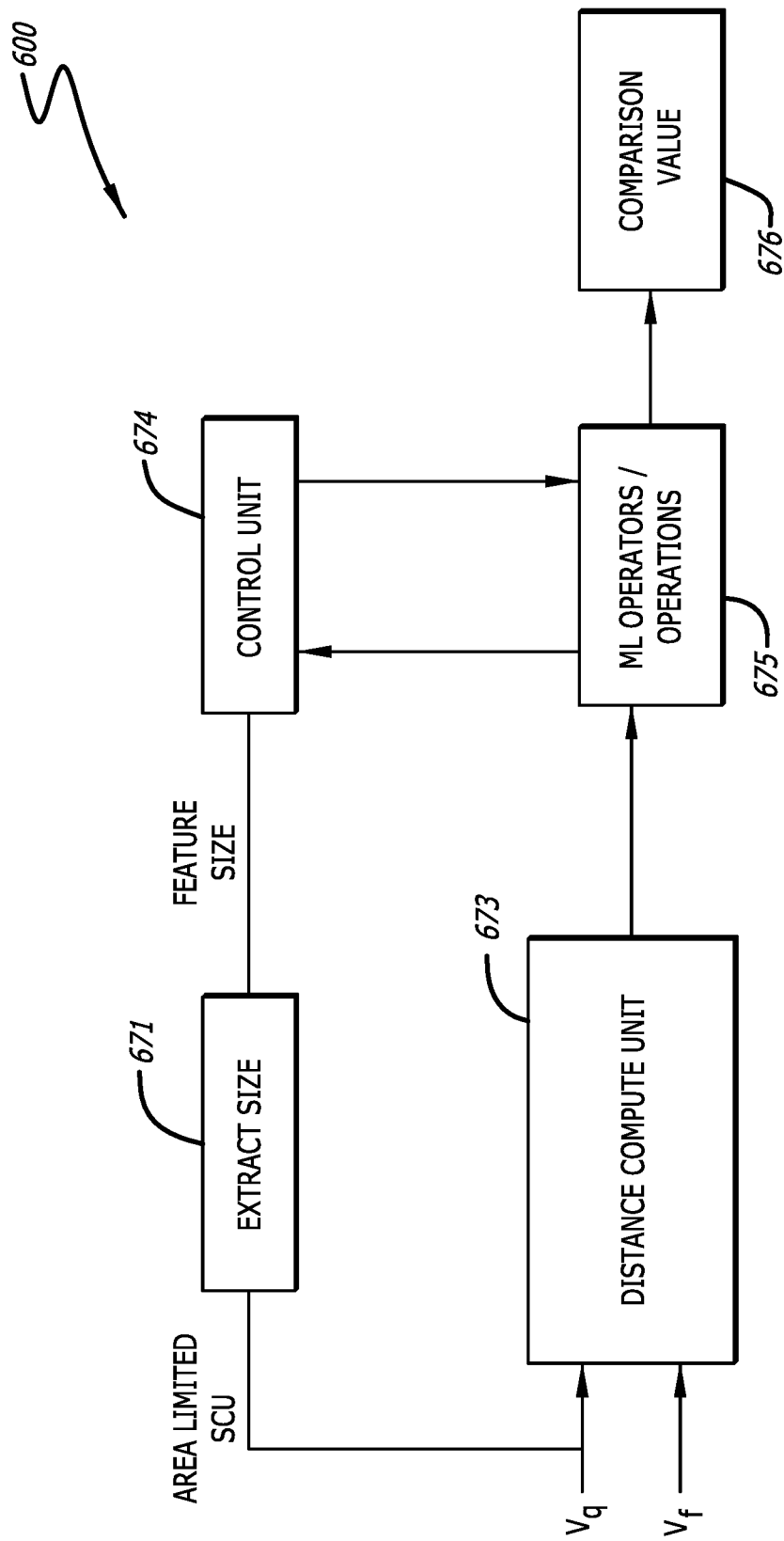
FIG. 6 is a schematic block diagram of an example machine learning processing unit of the computational SSD system supporting semantic search in accordance with an embodiment of the disclosure.

Referring to FIG. 6, a schematic block diagram of an example machine learning processing unit of the computational SSD system supporting semantic search in accordance with an embodiment of the disclosure. In some embodiments, the machine learning processing unit 421 may be configured to trade off speed for area, where area is limited, yielding hardware reuse or serial processing with lower speed. As an example, the machine learning processing unit 600 may be configured for high area efficiency. The machine learning processing unit 600 may include hardware, firmware, software, electrical circuitry and/or components, or any combinations thereof for performing machine learning processes, computations, comparisons, operations, or other processing. The machine learning processing unit 600 includes module 671 that determines the feature vector size of query vector $V_q$, distance compute unit 673 for computing the distance (e.g., Euclidean/Hamming distance) between two input vectors (e.g., $V_q$, $V_f$), control unit 674 that receives the feature size extracted from query vector $V_q$ by module 671 and adapts to the variable feature vector size by, for example, comparing the number of distance comparisons to the feature vector size and choosing the correct one as the final similarity score of all the input feature vectors $V_f$. Further, the machine learning processing unit 600 includes module 675 having one or more machine learning operators, functions, or registers to perform machine learning processing, for example, comparing two distance inputs from the distance compute units 673 and outputting the smaller distance to a register. The register of module 675 may then provide the result, score, or value to non-volatile memory devices 423 and/or controller 426.

Figure 7:
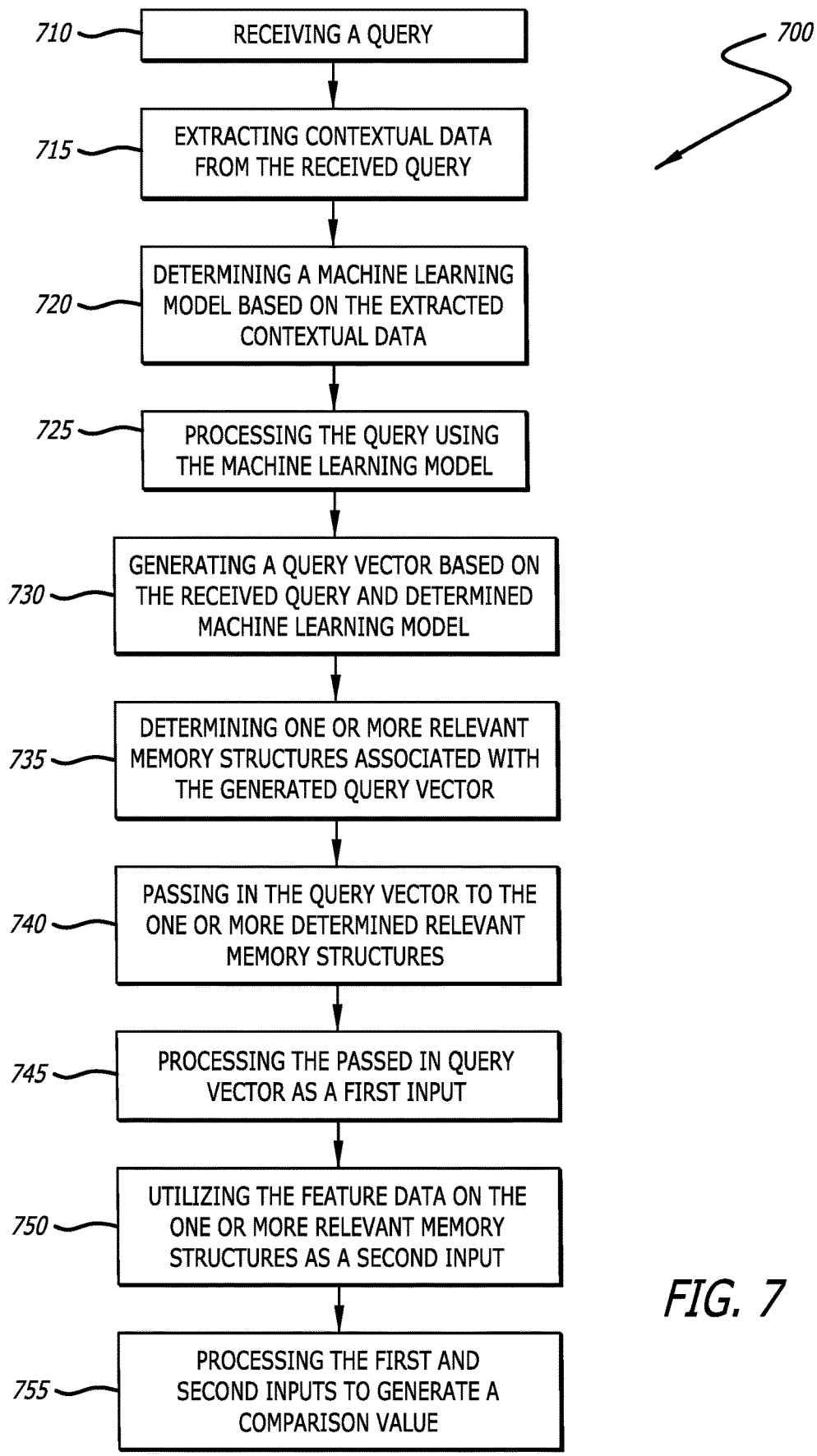
FIG. 7 is a flowchart depicting a process for utilizing an example computational SSD system supporting semantic search in accordance with an embodiment of the disclosure.

Referring to FIG. 7, a flowchart depicting a process 700 for utilizing an example computational SSD system supporting semantic search in accordance with an embodiment of the disclosure. The process 700 can begin by receiving a query (block 710). In many embodiments, this occurs the host or SSD controller receives a query for a semantic search. In some embodiments, the user provides a semantic search request that is passed to the host or SSD controller. In response, a variety of embodiments of the controller may direct a plurality of processes, such as those within the controller 426 for computational SSD system supporting semantic search (see FIG. 4) to execute the semantic search process 700.

The process 700 can extract contextual data from the received query (block 715). In some embodiments, the contextual data may be obtained directly from the query. As described above, in some embodiments, the contextual information relevant to the query may be obtained through other resources to help build contextual data for the query. Relevant contextual information for building contextual data may be obtained by comparison of the query and/or contextual data with one or more machine learning processes having access to dictionaries, libraries, or databases, or a combination thereof.

The process 700 can determine a machine learning model based on the extracted contextual data (block 720). As known in the art, various machine learning models may be used to extract and process features from the query, for example, convolutional neural network (CNN), computer vision, supervised learning, semi-supervised learning, unsupervised learning, reinforcement learning (RL), deep learning (DL), Artificial neural networks (ANNs), computer vision, speech recognition, natural language processing, machine translation, and others as desired.

Upon determination of a machine learning model based on the extracted contextual data, the process 700 may utilize the machine learning model to process the query (block 725). By way of example and not limitation, in processing the query, various features may be obtained from the machine learning model, the features may be processed to create a vector and prepared for machine learning processes such as a similarity search.

Based on the features obtained from the received query and the determined machine learning model, the process 700 can generate a query vector (block 730) and determine one or more relevant non-volatile memory devices associated with the generated query vector (block 735). As discussed above, the non-volatile memory device 123 may be part of any suitable storage device 120 that may have a variety of different types of memory devices. By way of example, and not limitation, a storage device may comprise a plurality of non-volatile NAND memory devices including single-level cell NAND memory and quad-level cell NAND memory.

The process 700 can pass in the query vector to the one or more determined relevant non-volatile memory devices (block 740). The process 700 can process the passed in query vector as a first input (block 745) and utilize the feature data on the one or more relevant non-volatile memory devices as a second input (block 750). As described above, the one or more determined relevant non-volatile memory devices have machine learning processing units for processing the query vector as a first input and the feature data stored on one or more non-volatile memory devices ass the second input.

The process 700 can process the first and second inputs to generate a comparison value (block 755). In certain embodiments, the process 700 may utilize hyperdimensional vectors/vector symbolic architecture to enable on-die calculation without error-correction code (ECC). In this way, features can be stored as hyperdimensional vectors rather than dense feature vectors which may be noise resilient.

Figure 8:
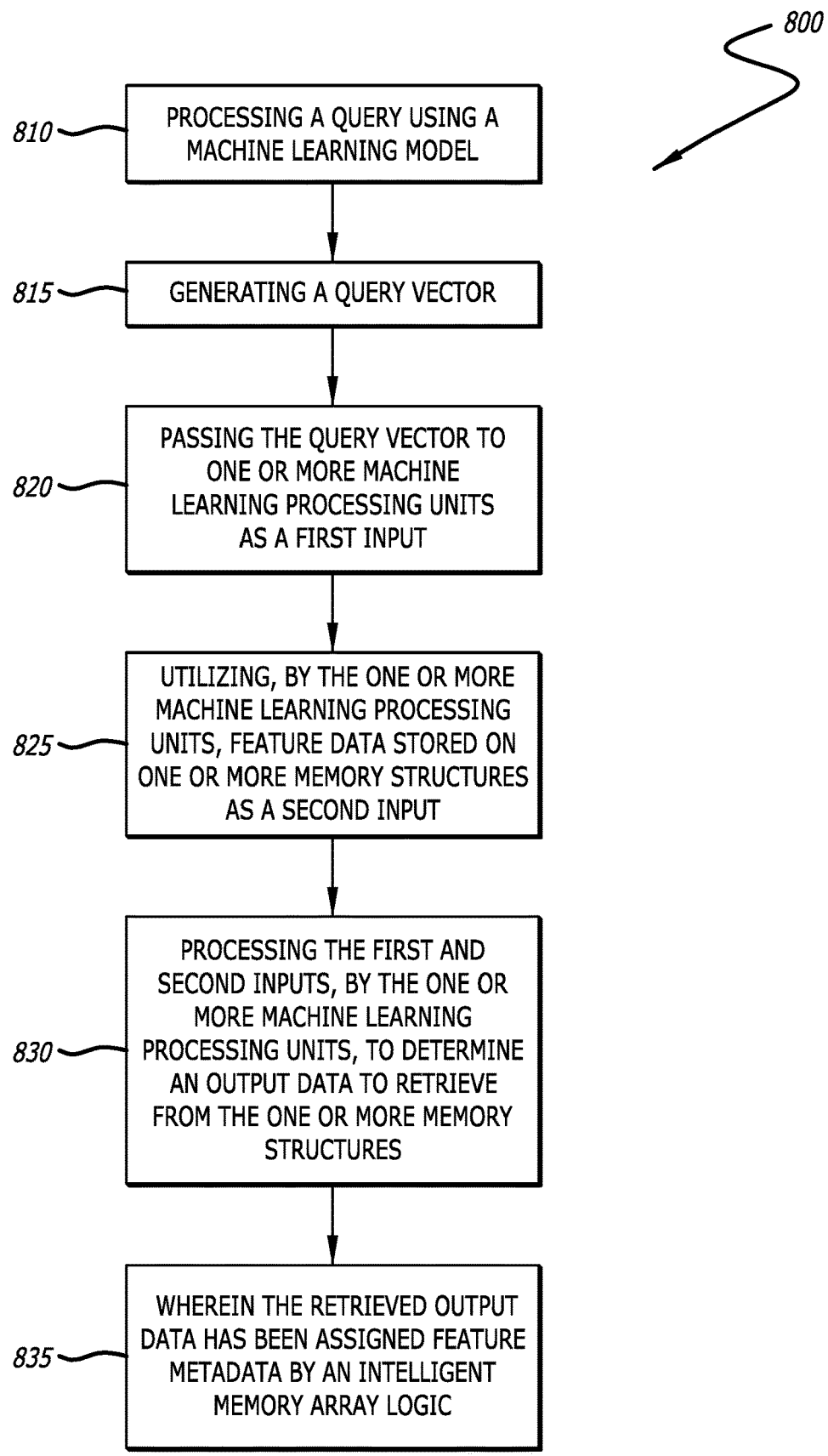
FIG. 8 is a flowchart depicting a process for utilizing an example computational SSD system supporting semantic search in accordance with an embodiment of the disclosure.

Referring to FIG. 8, a flowchart depicting a process 800 for utilizing an example computational SSD system supporting semantic search in accordance with an embodiment of the disclosure. The process 800 can begin by processing a query using a machine learning model (block 810). In many embodiments, this occurs the host or SSD controller receives a query for a semantic search. In some embodiments, the user provides a semantic search request that may be passed to the host or SSD controller. In response, a variety of embodiments of the controller may direct a plurality of processes, such as those within the controller 426 for computational SSD system supporting semantic search (see FIG. 4) to execute the semantic search process 800.

The process 800 can generate a query vector (block 815). In generating a query vector, contextual data may be obtained directly from the query and processing of the query by the machine learning model. By way of example and not limitation, in processing the query, various features may be obtained from the machine learning model, the features may be processed to create a vector and prepared for machine learning processes such as a similarity search. As known in the art, various machine learning models may be used to extract and process features from the query, for example, convolutional neural network (CNN), computer vision, supervised learning, semi-supervised learning, unsupervised learning, reinforcement learning (RL), deep learning (DL), Artificial neural networks (ANNs), computer vision, speech recognition, natural language processing, machine translation, and others as desired.

The process 800 can pass in the query vector to one or more machine learning processing units as a first unit (block 820) that further utilizes feature data stored on one or more relevant non-volatile memory devices as a second input (block 825). The process 800 can utilize the one or more machine learning processing units to process the first and second inputs to determine an output data to retrieve from the one or more non-volatile memory devices (block 830). Process 800 can assign feature metadata to the output data using the intelligent memory array logic (block 835). In certain embodiments, the process 800 may utilize hyperdimensional vectors/vector symbolic architecture to enable on-die calculation without error-correction code (ECC). In this way, features can be stored as hyperdimensional vectors rather than dense feature vectors which may be noise resilient.

Referring to FIGS. 7-8, hyperdimensional computing for calculating similarity among data and may be realized by, for example, three operations, including addition, multiplication, and permutation. Hyperdimensional computing may be inherently robust as information is evenly distributed over every bit of the hypervectors and provides fast learning ability, high energy efficiency and acceptable accuracy in learning and classification tasks.

Figure 9:
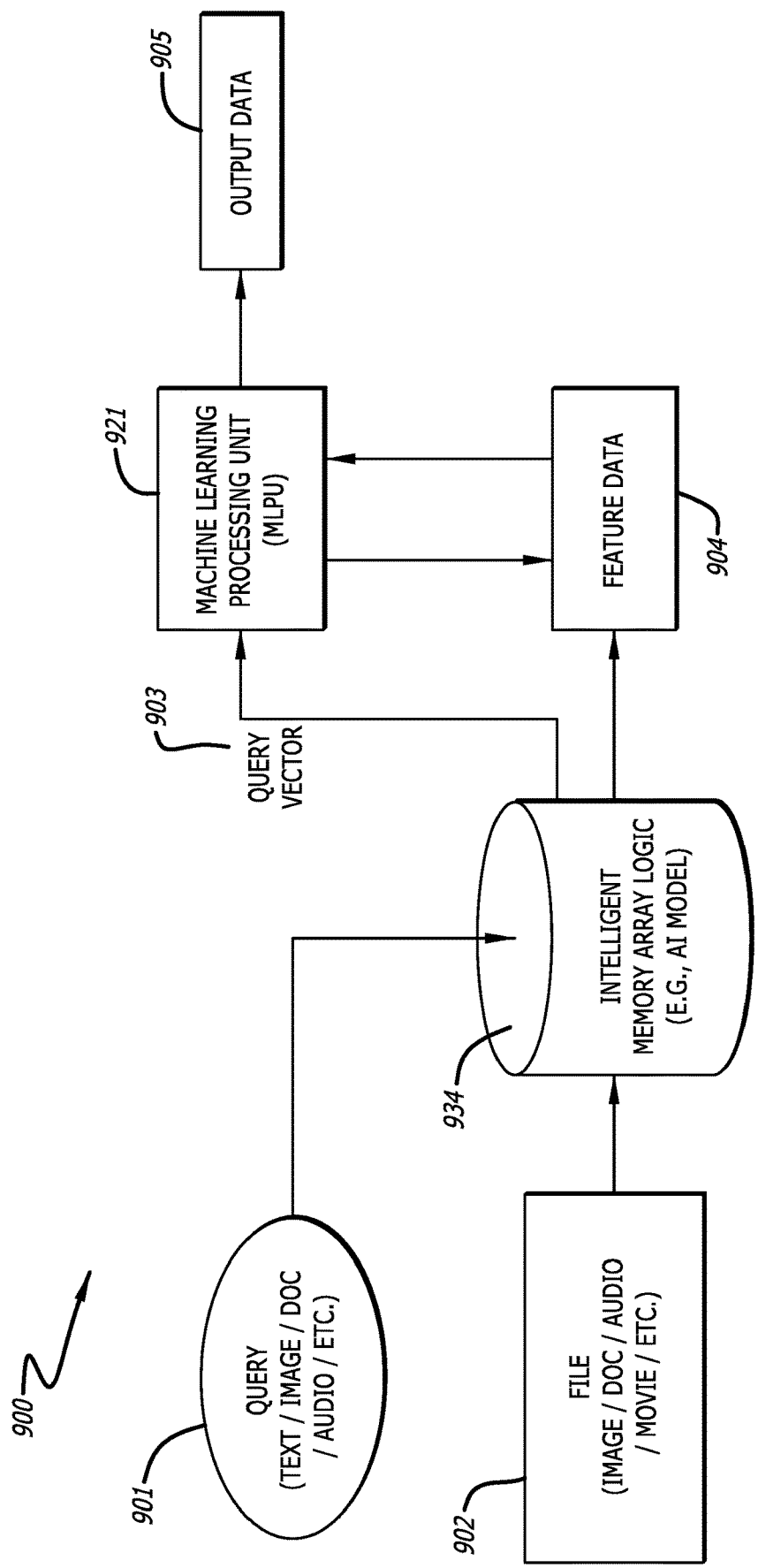
FIG. 9 is a schematic block diagram of an example machine learning process in accordance with an embodiment of the disclosure.

Referring to FIG. 9, a schematic block diagram of an example machine learning process in accordance with an embodiment of the disclosure. As shown an input for a machine learning system 900 may include semantic search request by one or more queries 901. The query 901 may include text, image, document, audio, or other media. The query 901 may be passed to an intelligent memory array logic 934 that performs machine learning processes, computations, comparisons, operations, or other processing to obtain and/or extract contextual data from the received query 901. The intelligent memory array logic 934 determines contextual data from query 901 and assigns features to the query 901 to forming query vector 903 as a first input for a machine learning processing unit (MPLU) 921 of machine learning system 900.

A second input for the machine learning system 900 includes stored data on SSD device such as one or more media files 902. The media file 902 may include text, image, document, audio, or other media. The stored media files 902 may be assigned feature data 904 by intelligent memory array logic 934 and each media file 902 can be stored on one or more non-volatile memory devices 123. The feature data 904 may be scanned by the MPLU 921 from one or more non-volatile memory devices 123 as the second input for comparison with the query vector 903.

The MPLU 921 follows an iterative process of retrieving, extracting, calculating, and comparing feature data 904 of stored media files 902 with query vector 903 to obtain output data 905. The output data 905 can be provided as a result of one or more operations by the MPLU 921. In some embodiments, the output data 905 may be a similarity score of the comparison between the query vector 903 and one or more sets of feature data 904. The output data 905 may then be passed to the controller 126 for further processing.

In some embodiments, the controller 426 may determine one or more suitable machine learning models or machine learning processes within intelligent memory array logic 934 for further processing the query 401. The intelligent memory array logic 934 may receive data (e.g., a query) and perform machine learning processes, computations, comparisons, operations, or other processing to obtain and/or extract contextual data from the received query 901.

As discussed above, each machine learning processing unit 921 may include hardware, firmware, software, electrical circuitry and/or components, or any combinations thereof for performing machine learning processes, computations, comparisons, operations, or other processing to obtain a result and/or value based on input(s) from feature data stored on non-volatile memory devices 123 and input(s) provided by the intelligent memory array logic 934.

In some embodiments, the query vector 903 and feature data 904 may be buffered in a memory device prior to processing by the one or more machine learning processing units 921. Moreover, the feature data 904 may be distributed evenly within the one or more non-volatile memory devices 123. In some embodiments, each of the one or more non-volatile memory devices 123 may be grouped into one or more memory sets based on similarity in machine learning processing units or similarity in feature data.

Figure 10A:
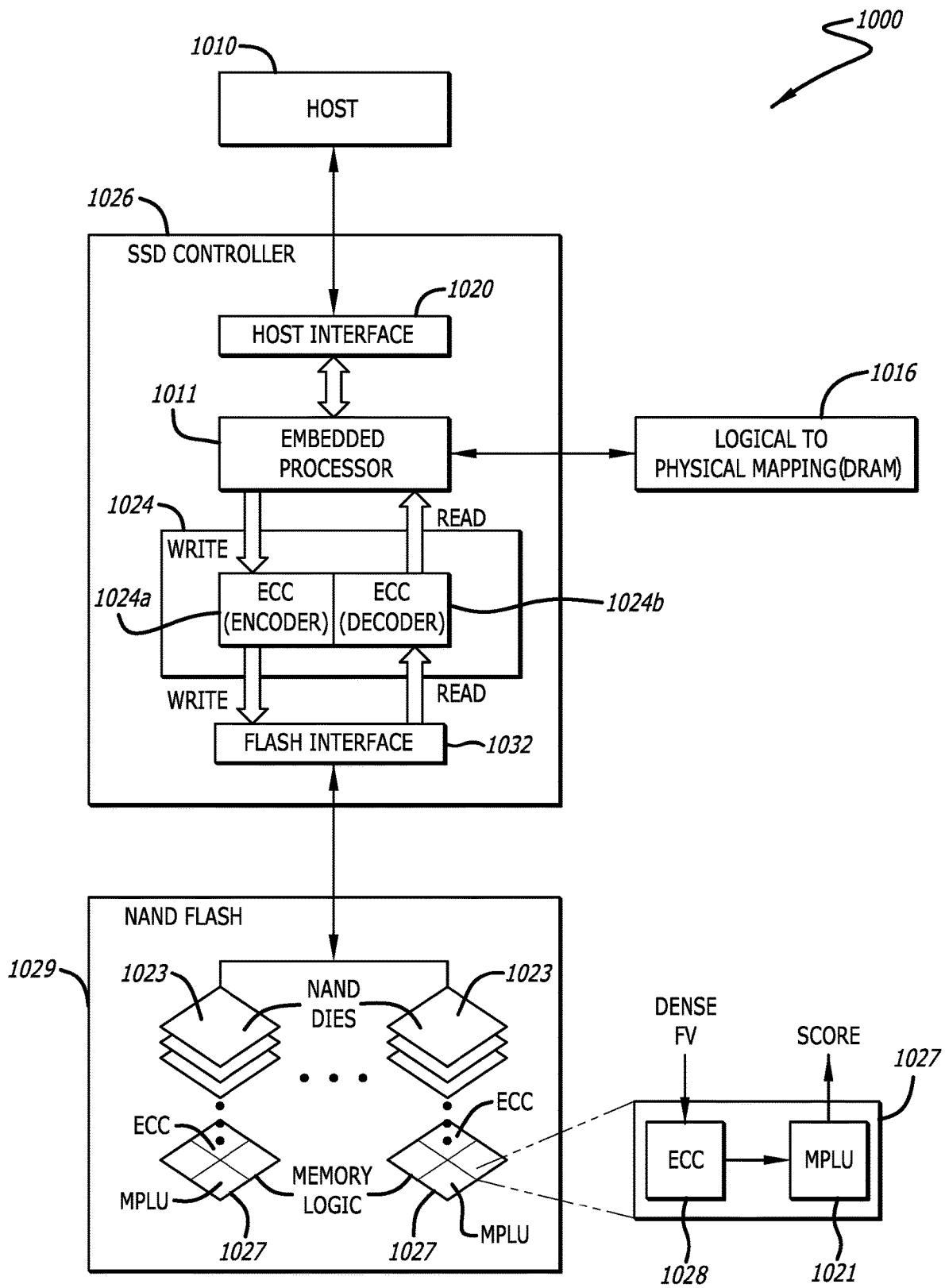
FIG. 10A is a schematic block diagram of an example error correction system in accordance with an embodiment of the disclosure.

Referring to FIG. 10A, a schematic block diagram of an example error correction system in accordance with an embodiment of the disclosure. As shown an error correction system 1000 for integrating ECC functions for encoding and decoding dense feature vectors.

The example error correction system 1000 may include host 1010, SSD controller 1026, NAND flash memory array 1029, and volatile memory 1016 (e.g., DRAM). The error correction system 1000 may further include host interface 1020, embedded processor 1011, ECC memory module 1024 having at least one encoding 1024a and decoding 1024b circuitry and processing, and flash interface 1032 included, in part or in whole, or otherwise in communication with or integrated within SSD controller 1026. The embedded processor 1011 may be in communication with volatile memory 1016. The volatile memory 1016 may be integrated within SSD controller 1026 and/or in communication with embedded processor 1011.

The NAND flash memory array 1029 may include a plurality of NAND dies 1023, each NAND die having memory circuitry and logic 1027 that includes ECC memory module 1028 and machine learning processing unit 1021. In some embodiments, the example error correction system 1000 may operate in storage mode where SSD controller 1026 receives file data and one or more instructions from host 1010 to store data on NAND dies 1023. Further, in storage mode, SSD controller 1026 may receive one or more instructions from host 1010 to access the same or different file data stored on NAND dies 1023. As shown, in write operation, ECC memory module 1024 may encode error correction code within file data to facilitate storage, retrieval and processing of error free file data on NAND dies 1023. Further, to retrieve error free file data to send to host 1010, in read operation, ECC memory module 1024 may process and/or remove file data errors received from file data stored on NAND dies 1023 using the encoded error correction code for the file data. In some embodiments, file data errors in storage mode may be introduced, for example and not by limitation, at flash interface 1032 or at any file data processing stage within SSD controller 1026 from receiving file data and/or instructions by host 1010 to storing file data and/or instructions on NAND flash memory array 1029.

In some embodiments, the example error correction system 1000 may operate in compute mode where NAND flash memory array 1029 utilizes memory circuitry and logic 1027 having ECC memory module 1028 to encode, decode, verify, and provide error free feature data (e.g., dense feature vector) to machine learning processing unit 1021 to compare with a query vector to obtain a score. Thus, each NAND die 1023 includes ECC functions for encoding and decoding feature data error correction code to provide error free feature data or error free dense feature vectors. Thus, NAND dies 1023 store at least two types of data: raw file data and feature data (e.g., feature vectors) corresponding to the file. The memory circuitry and logic 1027 may perform feature data management to maximize feature data processing efficiency, for example, parallel processing of feature data and on-die. In some embodiments, similar to machine learning processing units 1021 being disposed in each NAND die 1023, memory circuitry and logic 1027 may also be distributed in NAND flash memory array 1029 as single units per each NAND die 1023 to handle file data and feature data stored on the corresponding NAND die 1023. Moreover, in some embodiments, feature data may be equally partitioned and distributed across each NAND die 1023 of NAND flash memory array 1029. Further, the feature vectors may be relocated within the same NAND die 1023 during storage management operations such as, for example, garbage collection.

Figures 10B, 10C:
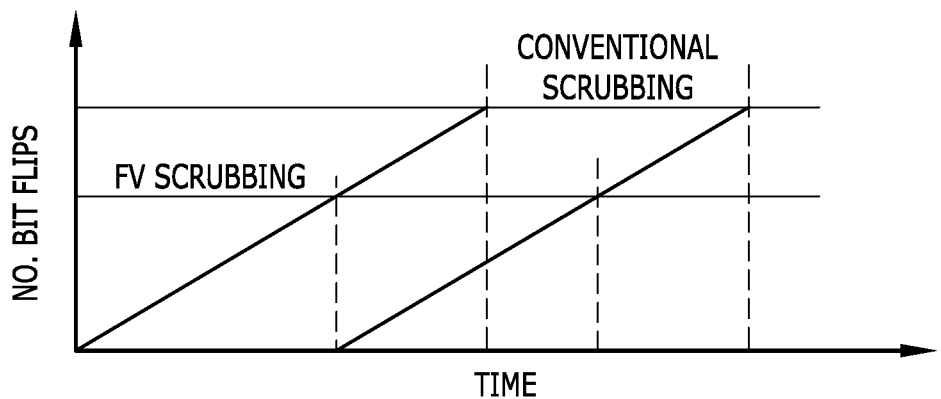
FIG. 10B is a chart of the example error correction system of FIG. 10A in accordance with an embodiment of the disclosure.
FIG. 10C is a table of the example error correction system of FIG. 10A in accordance with an embodiment of the disclosure.

FIG. 10B is a chart of the example error correction system of FIG. 10A in accordance with an embodiment of the disclosure. To ensure data integrity, data scrubbing may be performed on feature vectors (e.g., using FV scrubbing) and file data (e.g., using conventional data scrubbing). As shown, the number of bit flips per time for FV data scrubbing on feature data may be performed at higher frequency than conventional data scrubbing on file data or at a fraction of the frequency of conventional data scrubbing, for example, $1/6$, $1/4$, $1/3$, $1/2$, $2/3$ conventional scrubbing time. Moreover, FV scrubbing and conventional scrubbing may be triggered once a predetermined threshold of bit flips is reached. For example, when an FV threshold is reached FV scrubbing can be performed and when a conventional threshold is reached conventional scrubbing may be performed. In some embodiments, a combination of time/frequency and threshold may be used to perform at least one of FV scrubbing or conventional scrubbing. As shown, FV data scrubbing may be performed at $2/3$ the time of a convention scrubbing of file data.

FIG. 10C is a table of the example error correction system of FIG. 10A in accordance with an embodiment of the disclosure. File data and feature data error correction is shown as described above. File data and feature data may also undergo data scrubbing to reduce the likelihood of single correctable errors accumulating into numerous uncorrectable errors. As shown, an error correction engine can be used to verify file data and conventional data scrubbing may be used for wear leveling to maintain data integrity of file data in storage mode. Conventional data scrubbing may include error correction techniques that use one or more background tasks to periodically inspect main memory or storage for errors, then correct detected errors using redundant data in the form of different checksums or copies of data. The file data is cleansed through a process of detecting and correcting corrupt or inaccurate records from a record set, table, or database and identifying incomplete, incorrect, inaccurate, or irrelevant parts of the data and then replacing, modifying, or deleting the erroneous, corrupt, or coarse data.

As an example, when the example error correction system 1000 is in compute mode for feature vector data (e.g., dense feature vectors) on-die ECC is required. In some embodiments, to reduce the area and latency overhead of on-die ECC, weaker ECC like Bose-Chaudhuri-Hocquenghem (BCH) may be used. In some embodiments, other types of on-die ECC may be used, for example, Low Density Parity Check (LDPC). Moreover, on-die ECC may further be used for file data error correction as well. In some embodiments, feature vector data (e.g., dense feature vectors) may be stored in their own memory blocks separate from file data to facilitate easier data management. In some embodiments, feature vector data (e.g., dense feature vectors) may be stored with relevant file data in the same memory block to facilitate faster compute times and data access. Data scrubbing of file data may use conventional data scrubbing described above, while feature data may use a separate data scrubbing algorithm to, for example, cleanup erroneous, incorrect, incomplete, empty, or duplicate feature vector data.

In some embodiments, when SSD storage device 120 is operating in semantic search mode, requests from host 1010 to serve read/write requests may be ignored, delayed, and performed after some semantic search operations have been completed, or queued to be performed after all semantic search operations have been completed, or any combination thereof. Thus, volatile memory 1016 may be used to load feature data related to data management data structures, rather than logical-to-physical (L2P) table for file data accesses.

In regard to feature vector data management, an application needs to maintain at least one database in SSD storage device 120 for performing fast semantic search, for example, the database may comprise of attributes: filename, hashvalue, and feature vector data. Moreover, at least one file may contain the attributes filename and hashvalue that will be loaded into the application when launching the application. In some embodiments, the information of hashvalue and feature vector data may be contained in one or more data structures (e.g., Table X) to index one or more feature vectors. In some embodiments, Table X may be stored in the SSD storage device 120 firmware, and Table X may comprise of attributes of Addr, hashvalue, and feature vector data. Further, according to the returned hashvalue(s) from the semantic search, the application may retrieve filename(s) from the search result. In some embodiments, Table X size may be proportional to the number of files stored in SSD storage device 120. Further, in some embodiments, Addr may be in the form of [Die, Plane, Block, Page, Segment] where the number of bit to represent Segment.

$$\text{Segment} = \log_2\left(\frac{\text{page size}}{\text{feature vector size} + \textit{hashvalue size}}\right).$$

In some embodiments, the hashvalue feature vector may be the concatenation of the hashvalue and its feature vector to simplify data management. Moreover, when SSD storage device 120 receives the search request (e.g., a query), the SSD controller 1026 needs to generate the special search command(s) and send them each NAND flash die 1023. The SSD controller 1026 may inform the NAND flash die 1023 which block(s) contains the feature vector data and the NAND flash die 1023 should perform the computation accordingly. Moreover, each NAND flash die 1023 may perform the function of top_k hashvalue=Loop(search(query_vec, plane #, block #, last_page #, last segment #).

Figure 11A:
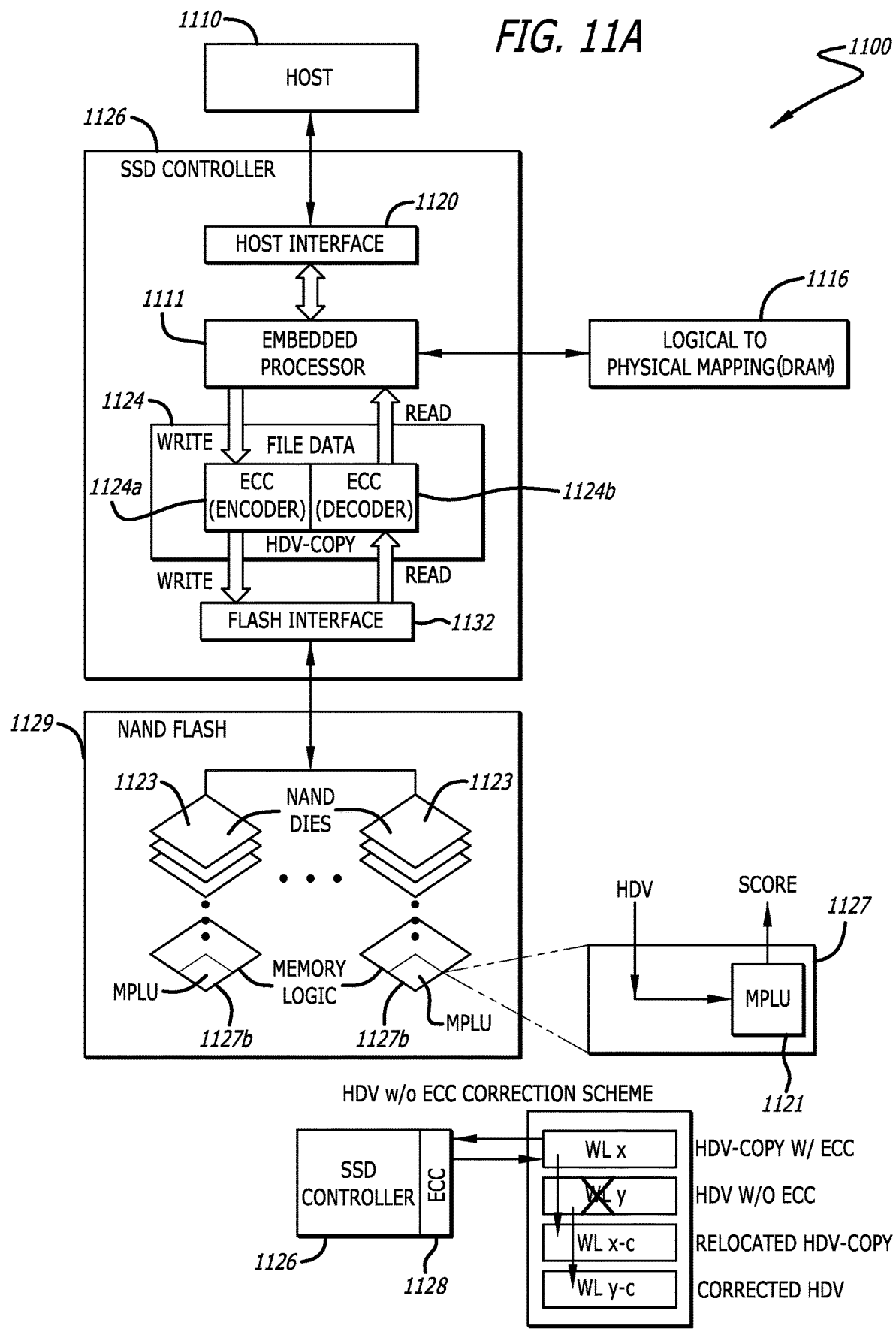
FIG. 11A is a schematic block diagram of an example error correction system in accordance with an embodiment of the disclosure.

FIG. 11A is a schematic block diagram of an example error correction system in accordance with an embodiment of the disclosure. As shown an error correction system 1100 for integrating ECC functions for encoding and decoding Hyper Dimensional Vectors (HDV) or Vector Symbolic Architecture (VSA) where on-die ECC may be optional. In the present disclosure HDV and VSA may be used interchangeably, however, hereinafter HDV will be used. In some embodiments, integrating ECC logic, circuitry, or processing in each NAND die 1123 may be too costly. For example, incorporating an ECC memory module 1128 in each NAND die 1123 may be prohibitively expensive, or take up too much area on the NAND flash memory array 1129. Instead, HDV/VSA may be stored for each file, where such contextual/semantic representations may be robust to noise, preserving similarities, and may be read from NAND flash dies 1123 and computed without error corrections.

The example error correction system 1100 may include host 1110, SSD controller 1126, NAND flash memory array 1129, and volatile memory 1116 (e.g., DRAM). The error correction system 1100 may further include host interface 1120, embedded processor 1111, ECC memory module 1124 having at least one encoding 1124a and decoding 1124b circuitry and processing, and flash interface 1132 included, in part or in whole, or otherwise in communication with or integrated within SSD controller 1126. The embedded processor 1111 may be in communication with volatile memory 1116. The volatile memory 1116 may be integrated within SSD controller 1126 and/or in communication with embedded processor 1111.

The NAND flash memory array 1129 may include a plurality of NAND dies 1123, each NAND die having memory circuitry and logic 1127 that includes machine learning processing unit 1121. In some embodiments, the example error correction system 1100 may operate in storage mode where SSD controller 1126 receives file data and one or more instructions from host 1110 to store data on NAND dies 1123. Further, in storage mode, SSD controller 1126 may receive one or more instructions from host 1110 to access the same or different file data stored on NAND dies 1123. As shown, in write operation, ECC memory module 1124 may encode error correction code within file data to facilitate storage, retrieval and processing of error free file data on NAND dies 1123. Further, to retrieve error free file data to send to host 1110, in read operation, ECC memory module 1124 may process and/or remove file data errors received from file data stored on NAND dies 1123 using the encoded error correction code for the file data. In some embodiments, file data errors in storage mode may be introduced, for example and not by limitation, at flash interface 1132 or at any file data processing stage within SSD controller 1126 from receiving file data and/or instructions by host 1110 to storing file data and/or instructions on NAND flash memory array 1129.

In some embodiments, the example error correction system 1100 may operate in compute mode where NAND flash memory array 1129 utilizes memory circuitry and logic 1127 and ECC memory module 1128 of SSD controller 1126 to encode, decode, verify, and provide error free feature data (e.g., HDV/VSA vector) to machine learning processing unit 1121 to compare with a query vector to obtain a score. Each NAND die 1123 utilizes two copies of HDV vectors, ECC functions from ECC memory module 1128, and an example error correction scheme described below to encode and decode feature data error correction code to provide error free feature data, for example, error free HDV vectors.

In the example error correction system 1100, NAND dies 1123 store at least two types of data: raw file data and HDV/VSA vectors. The feature data (e.g., HDV vectors) corresponding to the file data may be very robust to noise, preserve similarities, and could be read from NAND dies 1123 and computed without error correction. In some embodiments, two copies of HDV vectors can be stored on each NAND die 1123 corresponding to the file data; a first copy, HDV without ECC coding and a second copy, HDV with SSD controller 1026 ECC encoding. As shown, the first copy of HDV vectors without ECC coding may be used by machine learning processing unit 1121. However, since there is up limitation on its resilience, blocks storing HDV vectors need to be wear leveled as well.

The second copy of HDV vectors with ECC coding can be used for correcting the errors in the first copy of HDV vectors. When a scrubbing algorithm finds the bit error rate of the HDV copy with ECC coding over the predefined threshold, corrected HDV without ECC coding may be stored on memory circuitry and logic 1127, and the HDV copy with ECC coding can be relocated onto on memory circuitry and logic 1127. In some embodiments, depending on the application, when VSA vectors are very long and super robust, a separate scrubbing algorithm for the second copy of HDV vectors with ECC coding may be not needed, otherwise, a separate scrubbing algorithm can be performed on HDV vectors with ECC coding.

The memory circuitry and logic 1127 may perform feature data management to maximize feature data processing efficiency, for example, parallel processing of feature data and on-die. In some embodiments, memory circuitry and logic 1127 may also be distributed in NAND flash memory array 1129 as single units per each NAND die 1123 to handle file data and HDV vector data stored on the corresponding NAND die 1123. Moreover, in some embodiments, feature data may be equally partitioned and distributed across each NAND die 1123 of NAND flash memory array 1129. Further, the feature vector data may be relocated within the same NAND die 1123 during storage management operations such as, for example, garbage collection.

Figures 11B, 11C:
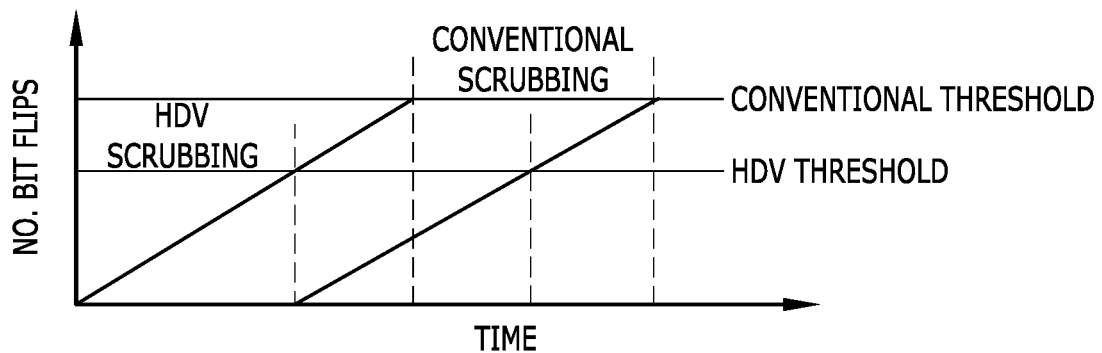
FIG. 11B is a chart of the example error correction system of FIG. 11A in accordance with an embodiment of the disclosure.
FIG. 11C is a table of the example error correction system of FIG. 11A in accordance with an embodiment of the disclosure.

FIG. 11B is a chart of the example error correction system of FIG. 11A in accordance with an embodiment of the disclosure. To ensure data integrity, data scrubbing may be performed on HDV vectors (e.g., using HDV scrubbing) and file data (e.g., using conventional data scrubbing). As shown, the number of bit flips per time for HDV data scrubbing on feature data may be performed at higher frequency than conventional data scrubbing on file data or at a fraction of the frequency of conventional data scrubbing, for example, $\frac{1}{6}$, $\frac{1}{4}$, $\frac{1}{3}$, $\frac{1}{2}$, $\frac{2}{3}$ conventional scrubbing time. Moreover, HDV scrubbing and conventional scrubbing may be triggered once a predetermined threshold of bit flips is reached. For example, when an HDV threshold is reached HDV scrubbing can be performed and when a conventional threshold is reached conventional scrubbing may be performed. In some embodiments, a combination of time/ frequency and threshold may be used to perform at least one of HDV scrubbing or conventional scrubbing. As shown, HDV data scrubbing may be performed at ⅔ the time of a convention scrubbing of file data.

FIG. 11C is a table of the example error correction system of FIG. 11A in accordance with an embodiment of the disclosure. File data and feature data error correction is shown as described above. File data and feature data may also undergo data scrubbing to reduce the likelihood of single correctable errors accumulating into numerous uncorrectable errors. As shown, SSD controller 1126 ECC may be used to verify file data and conventional data scrubbing may be used, for example, Low Density Parity Check (LDPC) for wear leveling to maintain data integrity of file data in storage mode. Conventional data scrubbing may include error correction techniques use one or more background tasks to periodically inspect main memory or storage for errors, then correct detected errors using redundant data in the form of different checksums or copies of data. The file data can be cleansed through a process of detecting and correcting corrupt or inaccurate records from a record set, table, or database and identifying incomplete, incorrect, inaccurate, or irrelevant parts of the data and then replacing, modifying, or deleting the erroneous, corrupt, or coarse data.

As an example, when the example error correction system 1100 is in compute mode, conventional data scrubbing may be not needed for the first copy of HDV vectors, (i.e., HDV, HDV vectors without ECC coding). In some embodiments, conventional data scrubbing may be used as necessary for the first copy of HDV vectors to maintain data integrity of feature data for the first copy of HDV vectors without ECC coding. Further, in compute mode, SSD controller 1126 ECC can be used to verify feature data of the second copy of HDV vectors, (i.e., HDV-COPY, HDV vectors with ECC coding) using, for example, Low Density Parity Check (LDPC). Moreover, at least one of conventional data scrubbing or HDV scrubbing using feature data scrubbing algorithm may be used to, for example, cleanup erroneous, incorrect, incomplete, empty, or duplicate feature vector data.

In some embodiments, when SSD storage device 120 is operating in semantic search mode, requests from host 1110 to serve read/write requests may be ignored, delayed, and performed after some semantic search operations have been completed, or queued to be performed after all semantic search operations have been completed, or any combination thereof. Thus, volatile memory 1116 may be used to load feature data related to data management data structures, rather than logical-to-physical (L2P) table for file data accesses. Moreover, HDV vector data management may be performed as described above.

In some embodiments, the hashvalue feature vector may be the concatenation of the hashvalue and its feature vector to simplify data management. Moreover, when SSD storage device 120 receives the search request (e.g., a query), the SSD controller 1126 needs to generate the special search command(s) and send them each NAND flash die 1123. The SSD controller 1126 may inform the NAND flash die 1123 which block(s) contains the feature vector data and the NAND flash die 1123 should perform the computation accordingly. Moreover, each NAND flash die 1123 may perform the function of top_k hashvalue=Loop(search(query_vec, plane #, block #, last_page #, last segment #)).

Figure 12:
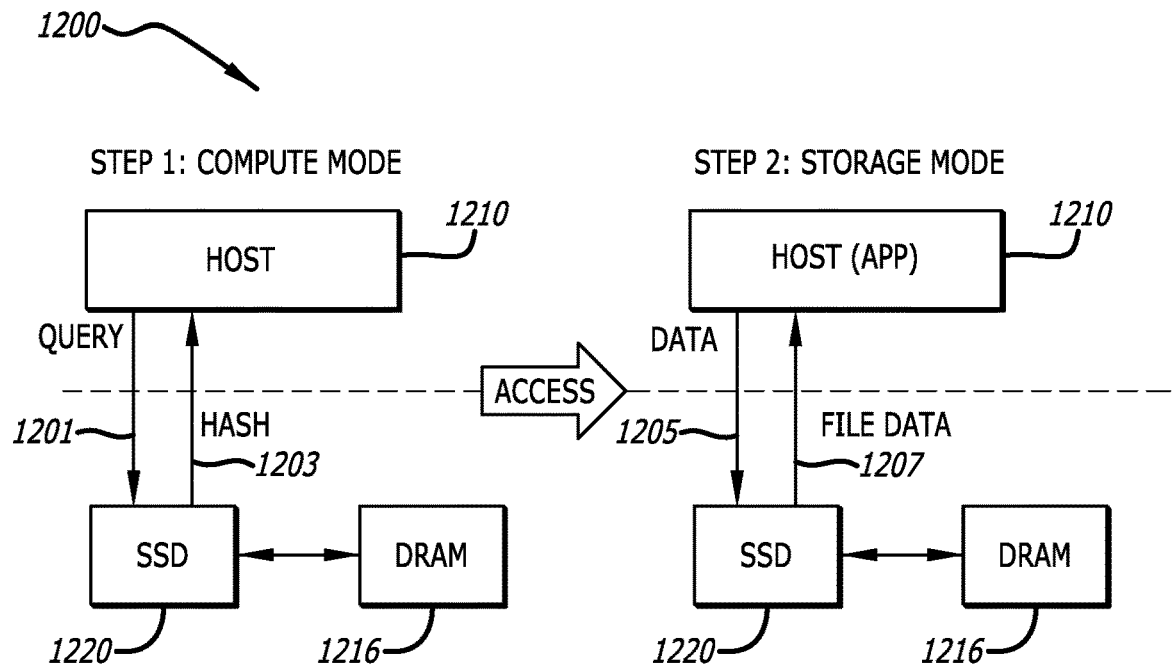
FIG. 12 is a schematic block diagram of an example error correction mode and storage mode of the computational SSD system supporting semantic search with error correction systems in accordance with an embodiment of the disclosure.

FIG. 12 is a schematic block diagram of an example error correction mode and storage mode of the computational SSD system 1200 supporting semantic search with error correction systems in accordance with an embodiment of the disclosure. As shown the example computational SSD system 1200 supports semantic search in compute mode and raw file data processing in storage mode with host 1210 providing respective instructions and file data or feature data to SSD storage device 1220. In some embodiments, where non-volatile memory 1316 is limited, SSD storage device 1320 could switch between compute mode and storage mode to achieve the result file retrieval. Moreover, requests from host 1310 to serve read/write requests may be ignored, delayed, and performed after some semantic search operations have been completed, or queued to be performed after all semantic search operations have been completed, or any combination thereof. Thus, volatile memory 1116 may be used to load feature data related to data management data structures, rather than logical-to-physical (L2P) table for file data accesses.

In step 1: compute mode, non-volatile memory 1216 (e.g., DRAM) may be used by Table X, the query 1201 may be sent to SSD storage device 1220, processed (e.g., machine learning processing unit 1021/1121) and then result or hash 1203 returned to the host 1210 for the semantic search request.

In step 2: storage mode, non-volatile memory 1216 (e.g., DRAM) may be used for L2P table mapping, the data request 1205 can be sent to SSD storage device 1220, processed (e.g., by SSD controller 1026/1126) and then file data 1207 returned to the host 1210 for the file search/read/write/access request.

Figure 13:
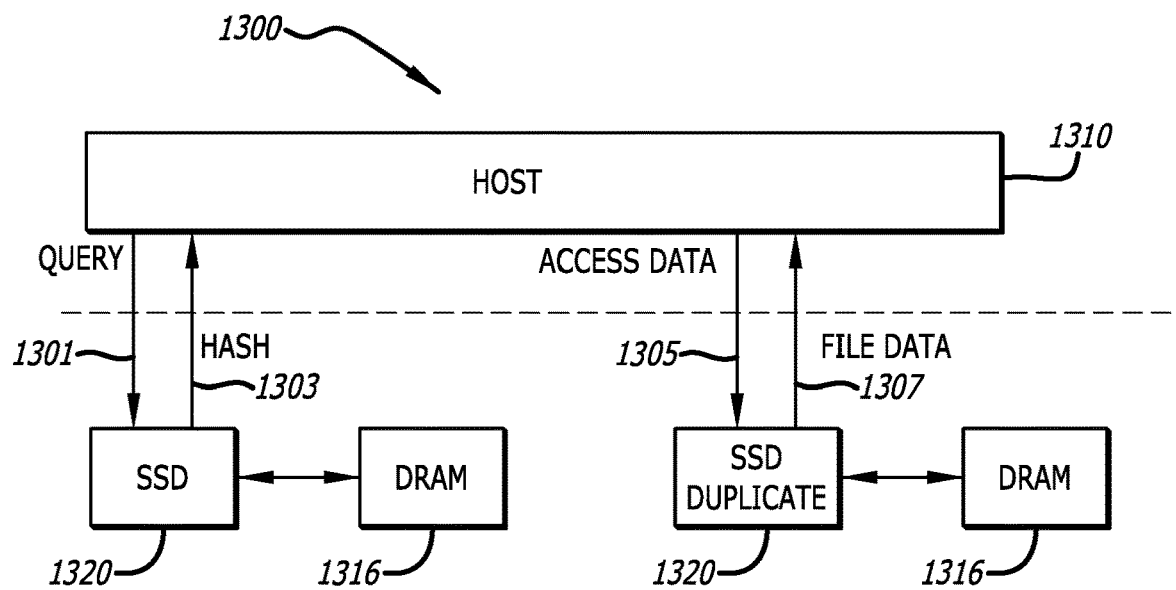
FIG. 13 is a schematic block diagram of another example error correction mode and storage mode of the computational SSD system supporting semantic search with error correction systems in accordance with an embodiment of the disclosure.

FIG. 13 is a schematic block diagram of another example error correction mode and storage mode of the computational SSD system 1300 supporting semantic search with error correction systems in accordance with an embodiment of the disclosure. In some embodiments, where non-volatile memory 1316 may be sufficient for both storage and compute modes, storage and compute operations may be done concurrently or in parallel without requiring separate modes.

For example, the non-volatile memory 1316 (e.g., DRAM) may be used by Table X, the query 1301 can be sent to SSD storage device 1320, processed (e.g., machine learning processing unit 1021/1121) and then result or hash 1303 returned to the host 1310 for the semantic search request. Further, in parallel, the non-volatile memory 1316 (e.g., DRAM) may be used for L2P table mapping, the data request 1305 may be sent to SSD storage device 1320, processed (e.g., by SSD controller 1026/1126) and then file data 1307 returned to the host 1310 for the file search/read/write/access request. Further, in some embodiments, where hyperscale or storage array is used, semantic searching and file data may be performed in parallel, and file data could be retrieved from conventional SSD with file replica from SSD storage device 1320.

Figure 14:
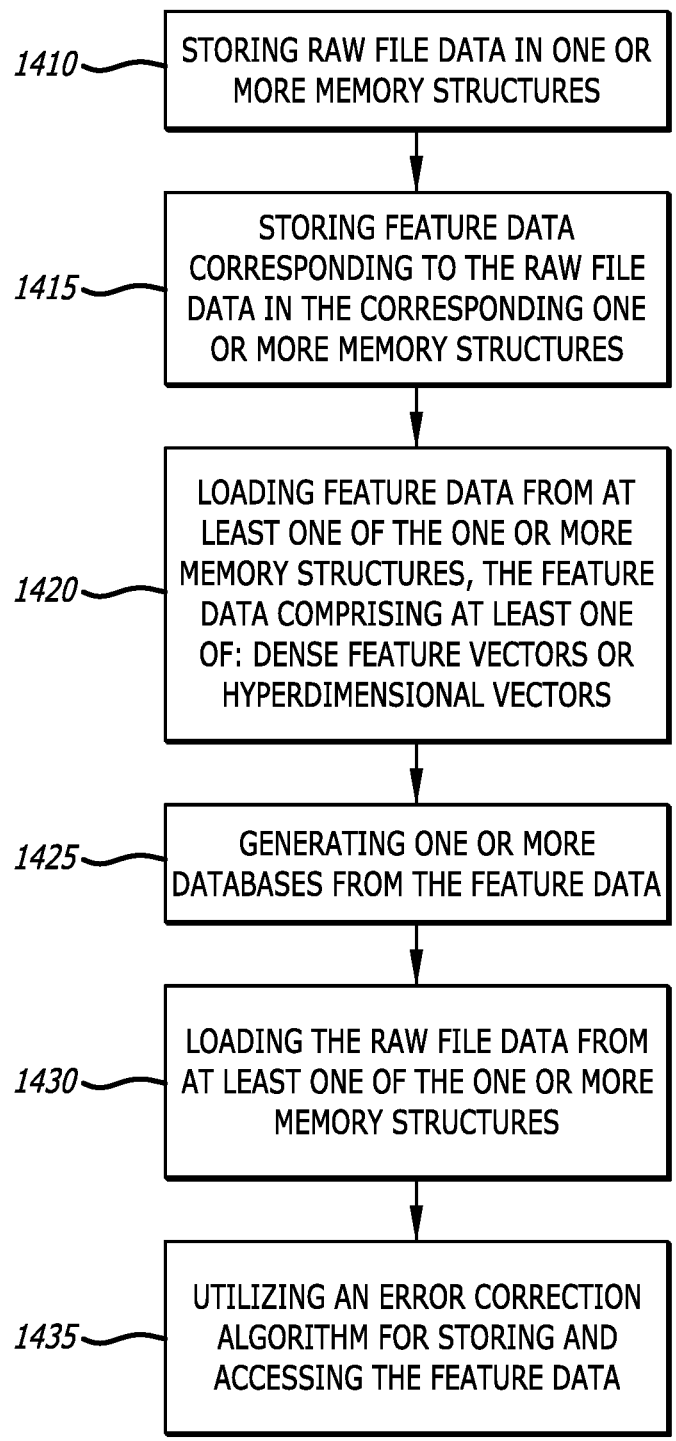
FIG. 14 is a flowchart depicting a process for utilizing an example error correction method in a computational SSD system supporting semantic search in accordance with an embodiment of the disclosure.

Referring to FIG. 14, a flowchart depicting a process 1400 for utilizing an example error correction method in a computational SSD system supporting semantic search in accordance with an embodiment of the disclosure. The process 1400 can begin by storing raw file data in one or more memory structures (block 1410). The process 1400 can store feature data corresponding to the raw file data in the corresponding one or more memory structures (block 1415). The process 1400 can load feature data from at least one of the one or more memory structures, the feature data comprising at least one of: dense feature vectors or hyperdimensional vectors (block 1420). The process 1400 can generate one or more databases from the feature data (block 1425). The process 1400 can load the raw file data from at least one of the one or more memory structures (block 1430). The process 1400 can utilize an error correction algorithm for storing and accessing the feature data (block 1435).

Figure 15:
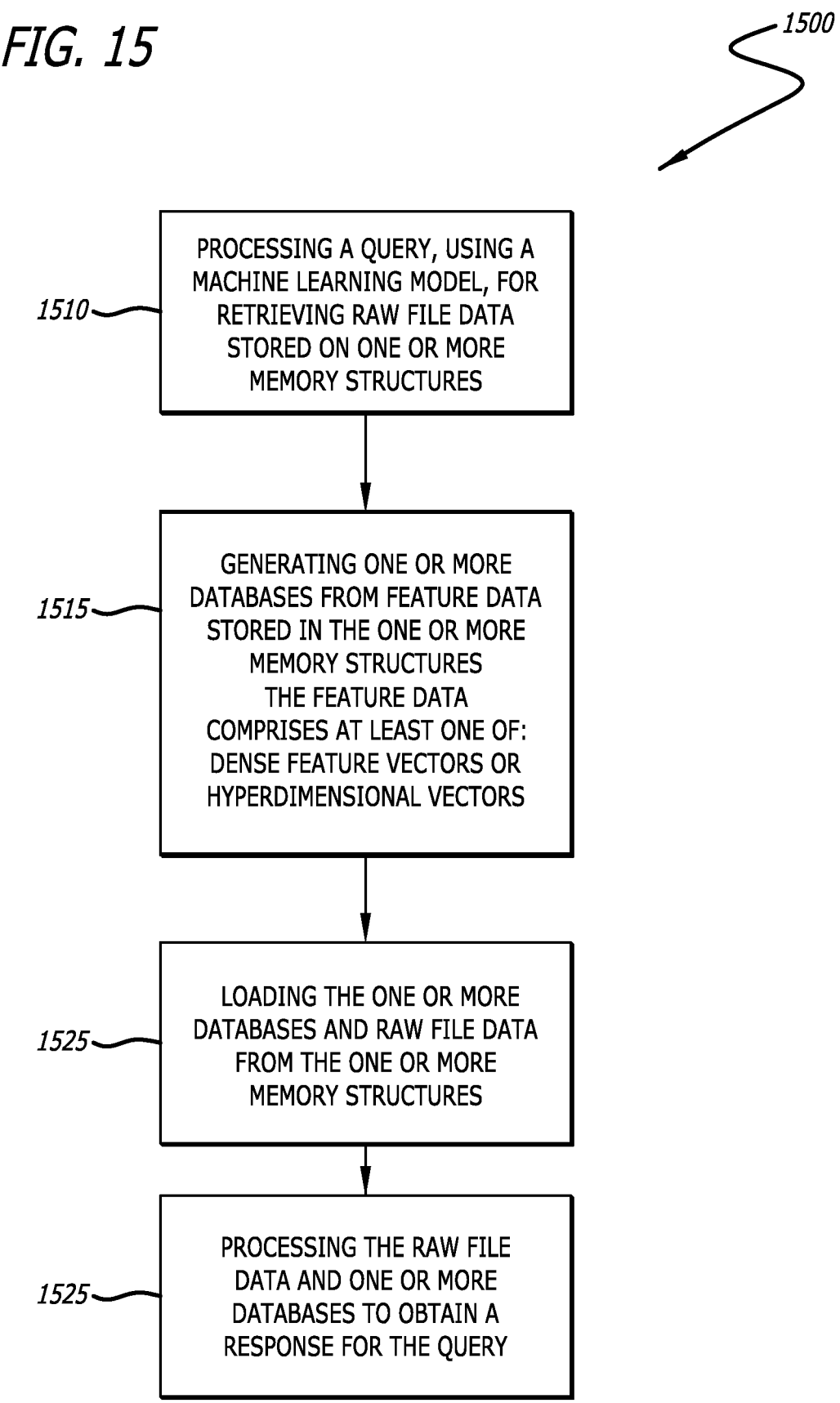
FIG. 15 is a flowchart depicting a process for utilizing an example error correction method in a computational SSD system supporting semantic search in accordance with an embodiment of the disclosure.

Referring to FIG. 15, a flowchart depicting a process 1500 for utilizing an error correction method in a computational SSD system supporting semantic search in accordance with an embodiment of the disclosure. The process 1500 can begin by processing a query, using a machine learning model, for retrieving raw file data stored on one or more memory structures (block 1510). The process 1500 can generate one or more databases from feature data stored in the one or more memory structures, the feature data comprises at least one of: dense feature vectors or hyperdimensional vectors (block 1515). The process 1500 can load the one or more databases and raw file data from the one or more memory structures (block 1525). The process 1500 can process the raw file data and one or more databases to obtain a response for the query (block 1525).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
    a processor;
    a memory array comprising a plurality of memory devices; and
    a controller communicatively coupled to the memory array;
    one or more memory structures configured to store raw file data and feature data corresponding to the raw file data;
    wherein the feature data comprises at least one of: dense feature vectors based on error-free data and hyperdimensional vectors;
    wherein each of the one or more memory structures utilizes an error correction algorithm for storing and accessing the feature data; and
    wherein each of the one or more memory structures comprises a machine learning processing units configured to process the feature data.

2. The device of claim 1, wherein the dense feature vectors are stored in separate blocks from raw file data.

3. The device of claim 1, wherein the feature data is distributed within the one or more memory structures.

4. The device of claim 1, wherein the error correction algorithm is implemented as an on-die Error Correction Code (ECC) with each of the one or more memory structures having ECC.

5. The device of claim 1, wherein the feature data comprises hyperdimensional vectors, and at least two copies of the hyperdimensional vectors are stored on each of the one or more memory structures, a first copy of the hyperdimensional vectors stored without using an error correction algorithm, and a second copy stored using an error correction algorithm.

6. The device of claim 5, wherein the first copy of the hyperdimensional vector is provided to the machine learning processing unit, and the second copy of the hyperdimensional vector is provided for correcting errors in the first copy.

7. A method comprising:
    storing raw file data in one or more memory structures;
    storing feature data corresponding to the raw file data in the corresponding one or more memory structures;
    loading feature data from at least one of the one or more memory structures;
    wherein the feature data comprises at least one of: dense feature vectors based on error-free data and hyperdimensional vectors;
    generating one or more databases from the feature data;
    loading the raw file data from at least one of the one or more memory structures; and
    utilizing an error correction algorithm for storing and accessing the feature data.

8. The method of claim 7, wherein storing feature data comprises storing the dense feature vectors in separate blocks from the raw file data.

9. The method of claim 7, further comprising distributing the feature data within the one or more memory structures.

10. The method of claim 7, wherein the error correction algorithm is implemented as an on-die Error Correction Code (ECC) with each of the one or more memory structures having ECC.

11. The method of claim 7, wherein the feature data comprises hyperdimensional vectors, and storing feature data comprises: storing at least two copies of the hyperdimensional vectors on each of the one or more memory structures, a first copy of the hyperdimensional vectors being stored without using an error correction algorithm, and a second copy being stored using an error correction algorithm.

12. The method of claim 7, wherein each of the one or more memory structures includes a machine learning processing unit, and wherein a first copy of the hyperdimensional vector is provided to the machine learning processing unit, and a second copy of the hyperdimensional vector is provided for correcting errors in the first copy.

* * * * *